US010336358B2

(12) United States Patent
Bacallao

(10) Patent No.: US 10,336,358 B2
(45) Date of Patent: Jul. 2, 2019

(54) SHOPPING CART BAGGING STATION AND METHOD OF FORMING THE SAME

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 244 days.

(21) Appl. No.: 15/433,365

(22) Filed: Feb. 15, 2017

(65) Prior Publication Data

US 2017/0174241 A1 Jun. 22, 2017

Related U.S. Application Data

(63) Continuation-in-part of application No. 15/383,151, filed on Dec. 19, 2016, now Pat. No. 10,259,480, (Continued)

(51) Int. Cl.
*B62B 3/10* (2006.01)
*B62B 3/14* (2006.01)

(52) U.S. Cl.
CPC .............. *B62B 3/106* (2013.01); *B62B 3/146* (2013.01); *B62B 2202/26* (2013.01)

(58) Field of Classification Search
CPC ...... B62B 3/106; B62B 3/146; B62B 2202/26
(Continued)

(56) References Cited

U.S. PATENT DOCUMENTS 259,932 A 6/1882 Sims
370,563 A 9/1887 Simmons
(Continued)

FOREIGN PATENT DOCUMENTS

AU 1142402 A1 4/2002
AU 2002364902 A1 5/2004
(Continued)

OTHER PUBLICATIONS

Non-Final Office Action in U.S. Appl. No. 15/383,170, dated Jul. 3, 2018; 10 pages.
(Continued)

*Primary Examiner* — Corey N Skurdal
(74) *Attorney, Agent, or Firm* — Schmeiser, Olsen & Watts LLP

(57) ABSTRACT

Shopping cart bagging stations are described that can be used by customers to bag their purchases as they shop. A shopping cart bagging station holds and dispenses at least one shopping bag. The shopping cart bagging stations are formed of a plurality of shopping cart bagging station elements that fit together using slot joints. Some of the slot joints may be rotational slot joints, which allow rotation of one or more of the shopping cart bagging station elements. The shopping cart bagging station may include a hinged support bar that allows the shopping cart bagging station to be folded. The hinge and the rotation of one or more of the shopping cart bagging station elements allows the shopping cart bagging station to be folded into a compact form when not in use, and quickly and easily opened for use.

14 Claims, 11 Drawing Sheets

Related U.S. Application Data which is a continuation-in-part of application No. 15/383,170, filed on Dec. 19, 2016, now Pat. No. 10,220,866, which is a continuation-in-part of application No. 15/383,126, filed on Dec. 19, 2016, now Pat. No. 10,266,195.

(60) Provisional application No. 62/448,481, filed on Jan. 20, 2017, provisional application No. 62/402,475, filed on Sep. 30, 2016, provisional application No. 62/377,143, filed on Aug. 19, 2016, provisional application No. 62/377,135, filed on Aug. 19, 2016, provisional application No. 62/298,017, filed on Feb. 22, 2016, provisional application No. 62/298,011, filed on Feb. 22, 2016, provisional application No. 62/270,785, filed on Dec. 22, 2015, provisional application No. 62/270,827, filed on Dec. 22, 2015, provisional application No. 62/270,813, filed on Dec. 22, 2015.

(58) Field of Classification Search
USPC .................................................. 224/411
See application file for complete search history.

(56) References Cited

U.S. PATENT DOCUMENTS

| | | | |
|---|---|---|---|
| 477,235 A * | 6/1892 | Timmerman | B65B 67/12 248/99 |
| 562,229 A | 6/1896 | Lenney | |
| 635,100 A | 10/1899 | Huebel | |
| 765,388 A | 7/1904 | Lanpher | |
| 797,871 A | 8/1905 | Smith | |
| 809,568 A | 1/1906 | Hulburt | |
| 873,188 A | 12/1907 | Thumann | |
| 890,693 A | 6/1908 | McCoy | |
| 893,930 A | 7/1908 | Lederman | |
| 896,443 A | 8/1908 | Dyett | |
| 936,736 A | 10/1909 | Porter et al. | |
| 995,798 A | 6/1911 | McCullough | |
| 1,055,745 A | 3/1913 | Harrison | |
| 1,069,108 A | 8/1913 | Buhl | |
| 1,252,740 A | 1/1918 | Thornblade | |
| 1,284,579 A | 11/1918 | Brown | |
| 1,653,393 A * | 12/1927 | Cox | B65B 67/1205 141/390 |
| 1,662,140 A | 3/1928 | Whitesides | |
| 2,240,629 A | 5/1941 | Smith | |
| 2,305,863 A * | 12/1942 | Ginter | B65B 67/1227 248/100 |
| 2,498,446 A | 2/1950 | Pawsat | |
| 2,563,679 A | 8/1951 | Hardy | |
| 2,603,438 A | 7/1952 | Adams | |
| 2,682,956 A | 7/1954 | Pike | |
| 2,797,058 A | 6/1957 | Packham | |
| 2,998,955 A | 9/1961 | Hertzog | |
| 3,133,660 A | 5/1964 | Roberts | |
| 3,266,742 A | 8/1966 | Pena | |
| 3,313,504 A | 4/1967 | Thorkild | |
| 3,339,745 A | 9/1967 | Sugerman | |
| D209,279 S | 11/1967 | Cohen | |
| 3,438,644 A | 4/1969 | Kaplan et al. | |
| 3,475,067 A | 10/1969 | Girard | |
| 3,747,298 A | 7/1973 | Lieberman | |
| 3,930,696 A | 1/1976 | Hight et al. | |
| 3,943,859 A | 3/1976 | Boone | |
| 3,995,803 A | 12/1976 | Uitz | |
| 4,048,754 A | 9/1977 | Laux | |
| 4,082,939 A | 4/1978 | Walters | |
| 4,106,617 A | 8/1978 | Boone | |
| 4,269,336 A | 5/1981 | Humlong | |
| 4,305,558 A | 12/1981 | Baker | |
| 4,354,643 A | 10/1982 | Kenner | |
| 4,367,819 A | 1/1983 | Lewis | |
| 4,376,502 A | 3/1983 | Cohen | |
| 4,403,807 A | 9/1983 | Wilkinson et al. | |
| 4,456,125 A | 6/1984 | Chap | |
| 4,480,810 A | 11/1984 | Hall | |
| 4,576,388 A | 3/1986 | Pope | |
| 4,583,753 A | 4/1986 | Economy | |
| 4,595,153 A | 6/1986 | Goetz | |
| 4,655,409 A | 4/1987 | Zima | |
| 4,682,782 A | 7/1987 | Mills | |
| 4,702,402 A | 10/1987 | Ferri | |
| 4,728,070 A | 3/1988 | Engelbrecht | |
| 4,838,504 A * | 6/1989 | Bittenbinder | B65B 67/1227 248/100 |
| D302,062 S | 7/1989 | Sable | |
| 4,881,577 A | 11/1989 | Stroh et al. | |
| 4,881,706 A * | 11/1989 | Sedlik | B65B 67/1227 248/99 |
| 4,968,047 A | 11/1990 | Ferris | |
| 4,974,799 A | 12/1990 | Palmer | |
| 4,997,149 A | 3/1991 | Koch | |
| 4,998,647 A | 3/1991 | Sharp | |
| 4,998,694 A * | 3/1991 | Barteaux | B65B 67/1216 248/100 |
| 5,002,215 A | 3/1991 | Gregoire | |
| 5,005,791 A * | 4/1991 | Lanzen | B65B 67/1211 248/99 |
| 5,190,253 A | 3/1993 | Sable | |
| 5,362,077 A | 11/1994 | Adamson | |
| 5,366,123 A | 11/1994 | Range | |
| 5,385,318 A | 1/1995 | Rizzuto | |
| 5,390,443 A | 2/1995 | Emalfarb et al. | |
| 5,427,288 A | 6/1995 | Trubee | |
| 5,437,346 A | 8/1995 | Dumont | |
| 5,439,120 A | 8/1995 | Brozak | |
| 5,443,173 A | 8/1995 | Emery et al. | |
| D363,208 S | 10/1995 | Seidel | |
| 5,460,279 A | 10/1995 | Emery et al. | |
| 5,465,846 A | 11/1995 | Blyth et al. | |
| 5,503,297 A | 4/1996 | Frankel | |
| 5,513,823 A * | 5/1996 | Bresnahan | B65B 67/1205 211/106 |
| 5,531,366 A | 7/1996 | Strom | |
| 5,533,361 A | 7/1996 | Halpern | |
| 5,564,566 A | 10/1996 | Lamb | |
| 5,618,008 A | 4/1997 | Dearwester et al. | |
| 5,636,818 A | 6/1997 | Edwards et al. | |
| 5,704,497 A | 1/1998 | Wyatt | |
| 5,727,721 A | 3/1998 | Guido et al. | |
| D396,372 S | 7/1998 | Goodman | |
| 5,836,486 A | 11/1998 | Ohsugi | |
| 5,875,902 A | 3/1999 | Emery et al. | |
| D412,080 S | 7/1999 | Emery et al. | |
| 6,018,397 A | 1/2000 | Cloutier et al. | |
| 6,041,945 A | 3/2000 | Faraj | |
| 6,086,023 A | 7/2000 | Kerr et al. | |
| 6,109,462 A | 8/2000 | Emalfarb et al. | |
| 6,152,408 A * | 11/2000 | O'Grady | B65B 67/1227 248/100 |
| 6,155,521 A | 12/2000 | O'hanlon | |
| 6,170,679 B1 | 1/2001 | Frye | |
| 6,193,265 B1 | 2/2001 | Yemini | |
| 6,299,001 B1 | 10/2001 | Frolov et al. | |
| 6,305,572 B1 | 10/2001 | Daniels et al. | |
| D452,944 S | 1/2002 | Schmidt | |
| 6,341,704 B1 | 1/2002 | Michel, Jr. | |
| 6,364,266 B1 | 4/2002 | Garvin | |
| 6,390,422 B2 | 5/2002 | Banko | |
| 6,409,031 B1 | 6/2002 | Wynne | |
| D459,979 S | 7/2002 | Goodman | |
| 6,481,583 B1 | 11/2002 | Black et al. | |
| 6,543,638 B2 | 4/2003 | Wile | |
| 6,561,403 B1 | 5/2003 | Kannankeril et al. | |
| 6,601,759 B2 | 8/2003 | Fife et al. | |
| 6,606,411 B1 | 8/2003 | Loui et al. | |
| 6,607,229 B1 | 8/2003 | McIntosh | |
| 6,648,265 B2 | 11/2003 | Goldberg | |
| 6,655,537 B1 | 12/2003 | Lang et al. | |
| 6,685,075 B1 | 2/2004 | Kannankeril | |
| 6,726,145 B1 | 4/2004 | Kraus | |

(56) References Cited

U.S. PATENT DOCUMENTS

| | | |
|---|---|---|
| 6,726,156 B1 | 4/2004 | Scola |
| D490,691 S | 6/2004 | Buss et al. |
| 6,745,186 B1 | 6/2004 | Testa et al. |
| 6,789,687 B2 | 9/2004 | Cramer |
| 6,805,271 B2 | 10/2004 | Holden |
| 6,810,149 B1 | 10/2004 | Squilla et al. |
| 6,832,739 B1 | 12/2004 | Kraus |
| 6,886,101 B2 | 4/2005 | Glazer et al. |
| 6,937,989 B2 | 8/2005 | Mcintyre et al. |
| 7,066,389 B2 | 6/2006 | Dickover et al. |
| 7,077,612 B1 | 7/2006 | Giggle, III et al. |
| 7,128,251 B1 | 10/2006 | Galle |
| 7,172,092 B2 | 2/2007 | Yang et al. |
| 7,177,820 B2 | 2/2007 | Mcintyre et al. |
| 7,182,210 B2 | 2/2007 | Metcalf |
| 7,192,035 B1 | 3/2007 | Lioce |
| D540,591 S | 4/2007 | Snell |
| 7,222,363 B2 | 5/2007 | Rice et al. |
| D552,901 S | 10/2007 | Wilfong, Jr. et al. |
| D571,518 S | 6/2008 | Waldman |
| D575,973 S | 9/2008 | Goodman et al. |
| 7,431,208 B2 | 10/2008 | Feldman et al. |
| 7,475,885 B2 | 1/2009 | Kovath |
| 7,530,537 B2 | 5/2009 | Kandah |
| 7,587,756 B2 | 9/2009 | Peart et al. |
| 7,610,717 B2 | 11/2009 | Luken et al. |
| 7,654,409 B2 | 2/2010 | Hoffman |
| 7,716,064 B2 | 5/2010 | Mcintyre et al. |
| D616,680 S | 6/2010 | Snider |
| 7,789,248 B1 | 9/2010 | Salerno et al. |
| 7,850,014 B2 | 12/2010 | Nguyen et al. |
| 7,887,068 B2 | 2/2011 | Ferguson |
| 8,002,127 B2 | 8/2011 | Ward et al. |
| 8,069,092 B2 | 11/2011 | Bryant |
| D650,209 S | 12/2011 | Snider |
| D654,737 S | 2/2012 | Guindi |
| 8,177,079 B2 | 5/2012 | Schwartzkopf et al. |
| D666,858 S | 9/2012 | Goodman |
| D667,250 S | 9/2012 | Goodman et al. |
| 8,292,094 B2 | 10/2012 | Morton |
| 8,336,800 B1 | 12/2012 | Lopez |
| D689,282 S | 9/2013 | Lindeman |
| 8,572,712 B2 | 10/2013 | Rice et al. |
| D693,577 S | 11/2013 | Goodman et al. |
| 8,640,890 B2 | 2/2014 | Schiller |
| 8,668,207 B1 | 3/2014 | Gilliam |
| 8,746,640 B2 | 6/2014 | Broadley et al. |
| 8,814,039 B2 | 8/2014 | Bishop et al. |
| D713,663 S | 9/2014 | Pryor |
| 8,820,633 B2 | 9/2014 | Bishop et al. |
| 8,851,369 B2 | 10/2014 | Bishop et al. |
| D718,054 S | 11/2014 | Goodman et al. |
| D719,372 S | 12/2014 | Goodman et al. |
| 8,905,411 B1 | 12/2014 | Blanton |
| D720,538 S | 1/2015 | Goodman et al. |
| D728,255 S | 5/2015 | Guindi et al. |
| 9,199,656 B1 | 12/2015 | Tong et al. |
| D746,592 S | 1/2016 | Goodman et al. |
| D747,876 S | 1/2016 | Goodman et al. |
| D750,472 S | 3/2016 | Kuka |
| D751,763 S | 3/2016 | Goodman et al. |
| D784,721 S | 4/2017 | Goodman et al. |
| 9,623,995 B2 | 4/2017 | Tan |
| D785,333 S | 5/2017 | Goodman et al. |
| D785,369 S | 5/2017 | Goodman et al. |
| D787,303 S | 5/2017 | Garvin |
| 9,656,827 B2 | 5/2017 | Sudhir |
| 9,694,840 B2 | 7/2017 | Hendrick et al. |
| 9,737,141 B2 | 8/2017 | Johnson |
| D796,771 S | 9/2017 | Bacallao et al. |
| D803,032 S | 11/2017 | Jammehdiabadi |
| 9,844,283 B2 | 12/2017 | Bacallao |
| 2002/0145086 A1 | 10/2002 | Alvarado et al. |
| 2002/0170937 A1 | 11/2002 | Yeh et al. |
| 2002/0185510 A1 | 12/2002 | Holsclaw |
| 2002/0185513 A1 | 12/2002 | Morris |
| 2003/0000905 A1 | 1/2003 | Zidek |
| 2003/0042694 A1 | 3/2003 | Werner |
| 2003/0052464 A1 | 3/2003 | McGuire |
| 2003/0098326 A1 | 5/2003 | Wile |
| 2003/0121871 A1 | 7/2003 | Zadro |
| 2003/0198390 A1 | 10/2003 | Loui et al. |
| 2004/0000529 A1 | 1/2004 | Gladnick et al. |
| 2004/0000612 A1 | 1/2004 | Young |
| 2004/0075015 A1 | 4/2004 | Cain et al. |
| 2004/0124598 A1 | 7/2004 | Williams |
| 2004/0139398 A1 | 7/2004 | Testa et al. |
| 2004/0178298 A1 | 9/2004 | Kennard |
| 2004/0262385 A1 | 12/2004 | Blaeuer |
| 2005/0056718 A1 | 3/2005 | Kamenstein |
| 2005/0205578 A1 | 9/2005 | Yeh |
| 2005/0284729 A1 | 12/2005 | LoRusso |
| 2006/0049591 A1 | 3/2006 | Pennell |
| 2006/0097467 A1 | 5/2006 | Solomon et al. |
| 2006/0124799 A1 | 6/2006 | Johnson |
| 2006/0226187 A1 | 10/2006 | Linker |
| 2007/0095769 A1 | 5/2007 | Jenkins |
| 2007/0176058 A1 | 8/2007 | Kohn |
| 2007/0186515 A1 | 8/2007 | Ruetten et al. |
| 2007/0204044 A1 | 8/2007 | Rice et al. |
| 2007/0261159 A1 | 11/2007 | Marks |
| 2007/0278359 A1 | 12/2007 | Kandah |
| 2008/0000910 A1 | 1/2008 | Gaillard |
| 2008/0001019 A1 | 1/2008 | Brown |
| 2008/0169253 A1 | 7/2008 | Vitale |
| 2008/0202851 A1 | 8/2008 | Schwenke et al. |
| 2008/0215448 A1 | 9/2008 | Boyle et al. |
| 2008/0215449 A1 | 9/2008 | Boyle et al. |
| 2008/0217342 A1 | 9/2008 | Cinque |
| 2008/0245684 A1 | 10/2008 | Yeatman |
| 2009/0078731 A1 | 3/2009 | Yi |
| 2009/0078815 A1 | 3/2009 | Tong et al. |
| 2009/0092342 A1 | 4/2009 | Rolim de Oliveira |
| 2009/0184162 A1 | 7/2009 | Rice et al. |
| 2009/0261050 A1 | 10/2009 | Curren |
| 2009/0319352 A1 | 12/2009 | Boyle et al. |
| 2009/0327087 A1 | 12/2009 | Beck et al. |
| 2010/0096514 A1 | 4/2010 | Adair et al. |
| 2010/0102014 A1 | 4/2010 | Yang |
| 2010/0123050 A1 | 5/2010 | Astwood |
| 2010/0148019 A1 | 6/2010 | Simhaee |
| 2010/0206825 A1 | 8/2010 | Johnston et al. |
| 2010/0219219 A1 | 9/2010 | Svetina |
| 2010/0264101 A1 | 10/2010 | Ma |
| 2011/0266092 A1 | 11/2011 | Marquis et al. |
| 2012/0125970 A1 | 5/2012 | Tsui |
| 2012/0167182 A1 | 6/2012 | Rice et al. |
| 2012/0169020 A1 | 7/2012 | Farrell |
| 2012/0305618 A1 | 12/2012 | Tan |
| 2012/0305619 A1 | 12/2012 | Tan |
| 2013/0026120 A1 | 1/2013 | Johnson |
| 2013/0037665 A1 | 2/2013 | Brasell et al. |
| 2013/0048689 A1 | 2/2013 | Ling |
| 2013/0092804 A1 | 4/2013 | Laitila et al. |
| 2013/0134181 A1 | 5/2013 | Helseth et al. |
| 2013/0264242 A1 | 10/2013 | Wojno |
| 2013/0330163 A1 | 12/2013 | Marsh |
| 2014/0048576 A1 | 2/2014 | Tan |
| 2014/0131506 A1 | 5/2014 | Clarkin |
| 2014/0144966 A1 | 5/2014 | Tan |
| 2014/0209651 A1 | 7/2014 | Wilfong |
| 2014/0367507 A1 | 12/2014 | Trampolski |
| 2016/0016752 A1 | 1/2016 | Helseth et al. |
| 2016/0096542 A1 | 4/2016 | Fukushima |
| 2016/0107668 A1 | 4/2016 | Robins |
| 2016/0183744 A1 | 6/2016 | Sadikov et al. |
| 2016/0227969 A1 | 8/2016 | Morris |
| 2016/0242605 A1 | 8/2016 | Heymann et al. |
| 2016/0270607 A1 | 9/2016 | Zeng |
| 2016/0300235 A1 | 10/2016 | Boyle et al. |
| 2016/0311454 A1 | 10/2016 | Hendrick et al. |
| 2016/0367088 A1 | 12/2016 | Allard et al. |
| 2017/0066550 A1 | 3/2017 | Tsai |
| 2017/0172322 A1 | 6/2017 | Bacallao |

(56) References Cited

U.S. PATENT DOCUMENTS

| | | | |
|---|---|---|---|
| 2017/0174243 | A1 | 6/2017 | Bacallao et al. |
| 2017/0197650 | A1 | 7/2017 | Whistler |
| 2017/0259959 | A1 | 9/2017 | Nilsson et al. |
| 2017/0267412 | A1 | 9/2017 | Krause |
| 2017/0275126 | A1 | 9/2017 | Sudhir |
| 2017/0325603 | A1 | 11/2017 | Bacallao |

FOREIGN PATENT DOCUMENTS

| | | |
|---|---|---|
| AU | 2003272329 | 6/2004 |
| CA | 2789288 A1 | 3/2014 |
| CA | 2958358 A1 | 8/2017 |
| DE | 29806330 U | 7/1998 |
| EP | 1182859 A2 | 2/2002 |
| EP | 1510944 A1 | 3/2005 |
| EP | 2387772 A1 | 11/2011 |
| EP | 2438562 A1 | 4/2012 |
| GB | 2547525 A1 | 8/2017 |
| JP | 2000112997 | 4/2000 |
| JP | 2007323453 A | 12/2007 |
| JP | 2008282412 A | 11/2008 |
| WO | 2002029702 | 4/2002 |
| WO | 2004042614 | 5/2004 |
| WO | 2004038997 | 6/2004 |
| WO | 2005094407 | 10/2005 |
| WO | 2006012538 | 2/2006 |
| WO | 2007141417 A1 | 12/2007 |
| WO | 2010083113 | 7/2010 |
| WO | 2011008625 | 1/2011 |
| WO | 2013079878 | 6/2013 |

OTHER PUBLICATIONS

Search Report in UK Patent Application No. GB1621562.6, dated Jun. 14, 2017; 4 pages.
Search Report in UK Patent Application No. GB1621564.2 dated Jun. 15, 2017; 5 pages.
Search Report in UK Patent Application No. GB1702839.0 dated Jun. 14, 2017; 5 pages.
Notice of Allowance in U.S. Appl. No. 15/653,768, dated May 2, 2018; 12 pages.
Notice of Allowance in U.S. Appl. No. 15/703,307, dated May 23, 2018; 5 pages.
Non-Final Office Action in U.S. Appl. No. 15/383,126, dated May 16, 2018; 6 pages.
Notice of Allowance in U.S. Appl. No. 15/641,367, dated Jun. 7 2018; 5 pages.
Non-Final Office Action in U.S. Appl. No. 15/383,151, dated May 25 2018; 13 pages.
Notice of Allowance in U.S. Appl. No. 16/053,248 dated Oct. 11, 2018; 7 pages.
Final Office Action in U.S. Appl. No. 15/383,126 dated Nov. 14, 2018; 6 pages.
Notice of Allowance in U.S. Appl. No. 15/383,170 dated Dec. 6, 2018; 5 pages.
Notice of Allowance in U.S. Appl. No. 15/383,151 dated Dec. 21, 2018; 9 pages.
Non-Final Office Action in U.S. Appl. No. 15/433,388 dated Dec. 31, 2018; 6 pages.
"POS Check Out Plastic Bag Holder Dispenser for Retail Supermarket Brand New!" Ebay.com, accessed on Nov. 17, 2016; 5 pages.
"Lot 2 Royston Plastic Grocery Bag Holder Dispenser Stand Point of Sale Shopping," TeraPeak.com, accessed on Nov. 17, 2016; 3 pages.
"Bag Holders," ULINE.mx, accessed on Nov. 17, 2016; 1 page.
"OEM Express Checkout Counter / Customized Supermarket Cash Register Stands Counters," Guangzhou ECO Commerical Equipment Co., Ltd, SupermarketCheckoutCounters.com, accessed on Nov. 17, 2016; 3 pages.
"Retrospec Bicycles Detachable Steel Half-Mesh Apollo Bike Basket with Handles," Retrospec Bicycles, Amazon.com, accessed on Apr. 27, 2017; 1 page.
"Transport trolley / waste / with waste bag holder / 1-bag WASTY 70 LT Francehopital," MedicalExpo.com, accessed on Apr. 25, 2017; 25 pages.
Jackie, "How to Make a Clothespin Bag," TheHappyHousewife.com, Apr. 19, 2012; 14 pages.
"Gluman Combo of 12 Sparkle Clothes Hangers (Yellow) and 6 Plastic Kitchen Storage Containers Blue (125 ml)," PAYtm.com, accessed on Apr. 24, 2017; 3 pages.
"Pack-N-Tote Reusable Grocery Cart Bag, Hooks Directly to the Shopping Cart, Black," Six Mour Creations, Amazon.com, accessed on Apr. 24, 2017; 5 pages.
"Toygully 12 Pack Solid Steel Finish Hangers with Clips strong," PAYtm.com, accessed on Apr. 26, 2017; 3 pages.
Search Report in GB Patent Application No. GB1713267.1, dated Dec. 22, 2017; 5 pages.
Non-Final Office Action in U.S. Appl. No. 15/653,768, dated Jan. 10, 2018; 31 pages.
Non-Final Office Action in U.S. Appl. No. 15/641,367, dated Jan. 12, 2018; 9 pages.
Non-Final Office Action in U.S. Appl. No. 15/703,307, dated Jan. 18, 2018; 9 pages.
Search Report in GB Patent Application No. GB1713283.8, dated Dec. 22, 2017; 4 pages.
Search Report in United Kingdom Patent Application No. GB1621567.5, dated Jun. 14, 2017; 5 pages.
Notice of Allowance in U.S. Appl. No. 29/572,901, dated May 17, 2017; 9 pages.
"Actionclub Wall Mount Grocery Bag Dispenser Kitchen Plastic Recycle Storage Box Garbage Bag Orangizer Container Holder," AliExpress.com, accessed on Jun. 14, 2017; 3 pages.
"BG001-0111 : Bag Dispenser—Single," BowmanDispensers.com, accessed on Jun. 14, 2017; 8 pages.
"Axis Chrome Over Cabinet Plastic Bag Holder," Organizelt.com, accessed on Jun. 14, 2017; 2 pages.
"Simplehuman Stainless Steel Grocery Bag Holder," ContainerStore.com, accessed on Jun. 14, 2017; 2 pages.
Notice of Allowance in U.S. Appl. No. 15/383,126 dated Jan. 15, 2019; 5 pages.
"Universal Double Car Vehicle Hangers/Hooks Grocery Bags/Handbags/Umbrellas Organizer—Black," DealsMachine.com, accessed on Oct. 15, 2015; 2 pages.
"Over-the-Door Hook 3 Hook InterDesign," Target.com, accessed on Oct. 15, 2015; 4 pages.
JoshM "Smart Shopping Cart: Bagging Station Design," EECS398SmartShoppingCart.blogspot.in, Mar. 22, 2015; 2 pages.
"Clear Suspended Ceiling Hook," DoItBest.com, accessed on Oct. 14, 2015; 3 pages.
"Industrial T-shirt Bag Stand—Just like Grocery Stores," SmallBizWarehouse.com, accessed on Oct. 14, 2015; 4 pages.
"Dual L-Shape Flash Bracket Holder Mount for Canon Nikon Speedlikte DSLR Camera," Amazon.com, accessed on Jan. 5, 2016; 5 pages.
"InterDesign Classico Over-the-Door Tie and Belt Rack," HoldnStorage.com, accessed on Nov. 22, 2016; 2 pages.
"Small Matte 'So-Hooked' Rack," The Container Store, accessed on Nov. 22, 2016; 2 pages.
Non-Final Office Action in U.S. Appl. No. 15/676,218, dated Feb. 22, 2019; 12 pages.
Non-Final Office Action in U.S. Appl. No. 16/238,705 dated Apr. 18, 2019; 7 pages.
Restriction Requirement in U.S. Appl. No. 15/676,143 dated Apr. 1, 2019; 6 pages.

* cited by examiner

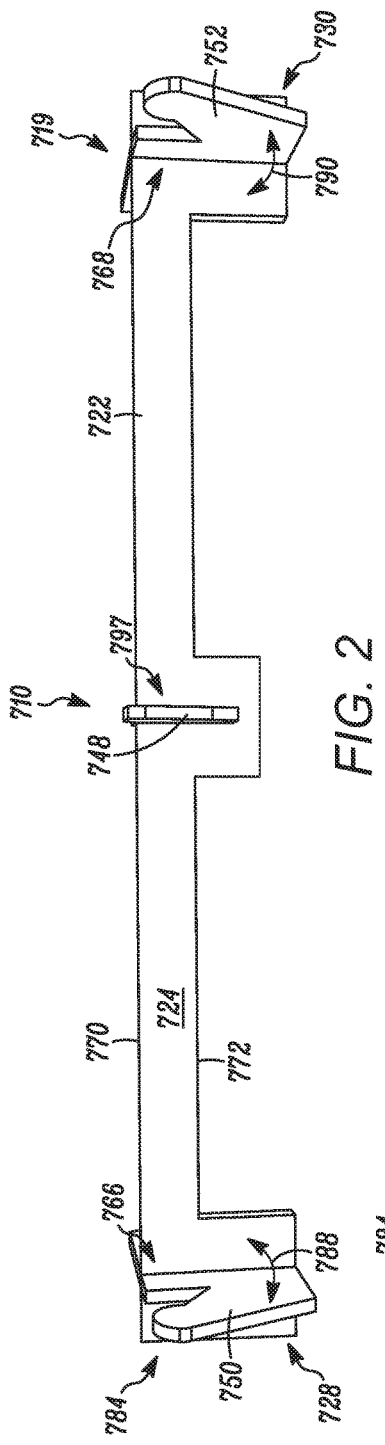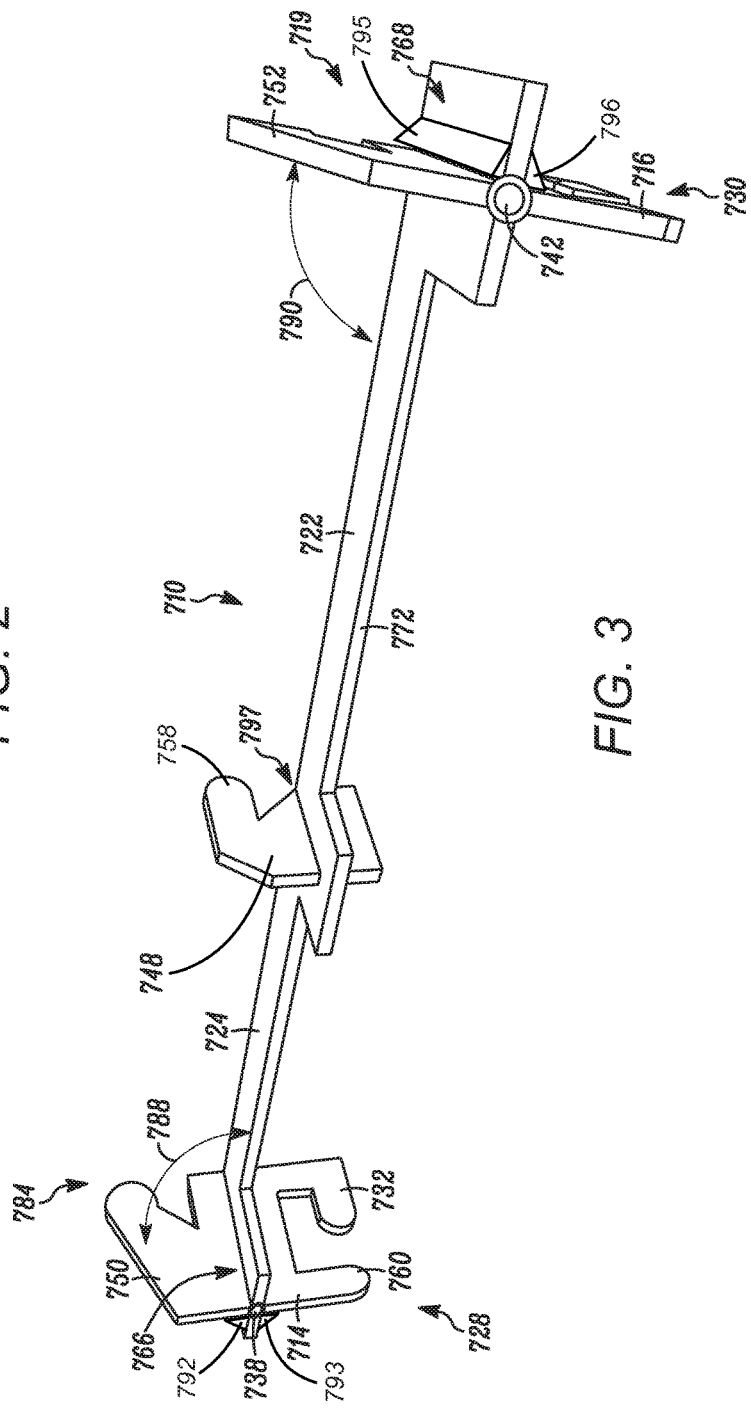

SHOPPING CART BAGGING STATION AND METHOD OF FORMING THE SAME

CROSS REFERENCE TO RELATED APPLICATIONS

This application is a continuation-in-part of U.S. non-provisional application Ser. No. 15/383,126, filed Dec. 19, 2016 to Applicant Wal-Mart Stores Inc., and entitled "Shopping Cart Bagging Station and Method of Forming the Same"; and this application is a continuation-in-part of U.S. non-provisional application Ser. No. 15/383,151, filed Dec. 19, 2016 to Applicant Wal-Mart Stores Inc., and entitled "Shopping Cart Bagging Station and Method of Forming the Same"; and this application is a continuation-in-part of U.S. non-provisional application Ser. No. 15/383,170, filed Dec. 19, 2016 to Applicant Wal-Mart Stores Inc., and entitled "Shopping Cart Bagging Station and Method of Forming the Same"; and this application claims priority to U.S. provisional patent application Ser. No. 62/298,011, filed Feb. 22, 2016 to Applicant Wal-Mart Stores Inc., and entitled "Shopping Cart Bagging Station and Method of Forming the Same", U.S. provisional patent application Ser. No. 62/298,017, filed Feb. 22, 2016 to Applicant Wal-Mart Stores Inc., and entitled "Shopping Cart Bagging Station and Method of Forming the Same", U.S. provisional patent application Ser. No. 62/377,135, filed Aug. 19, 2016 to Applicant Wal-Mart Stores Inc., and entitled "Shopping Cart Bagging Station and Method of Forming the Same", U.S. provisional patent application Ser. No. 62/377,143, filed Aug. 19, 2016 to Applicant Wal-Mart Stores Inc., and entitled "Shopping Cart Bagging Station and Method of Forming the Same", U.S. provisional patent application Ser. No. 62/402,475, filed Sep. 30, 2016, to Applicant Wal-Mart Stores Inc., and entitled "Shopping Cart Bagging Station and Method of Forming the Same" and U.S. provisional patent application Ser. No. 62/448,481, filed Jan. 20, 2017 to Applicant Wal-Mart Stores Inc., and entitled "Shopping Cart Bagging Station and Method of Forming the Same", each of which is incorporated herein by reference in its entirety.

BACKGROUND OF THE INVENTION

Technical Field

This invention relates to retail store fixtures, and, more specifically, to bagging stations that couple to a shopping cart.

State of the Art

A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. With the advent of electronic purchasing and self-checkout, however, customers are able to pay for and bag their products as they shop, and these actions can occur at locations besides checkout stations. There is a need for bagging stations in locations in retail stores besides at the checkout station.

Accordingly, what is needed is a bagging station that can be mounted in a shopping cart, so that customers can bag their purchases as they shop.

BRIEF DESCRIPTION OF THE DRAWINGS

FIG. 2 shows a front perspective view of an embodiment of a shopping cart bagging station;

FIG. 3 shows a bottom perspective view of the shopping cart bagging station of FIG. 2;

DETAILED DESCRIPTION OF EMBODIMENTS OF THE INVENTION

Figure 1:
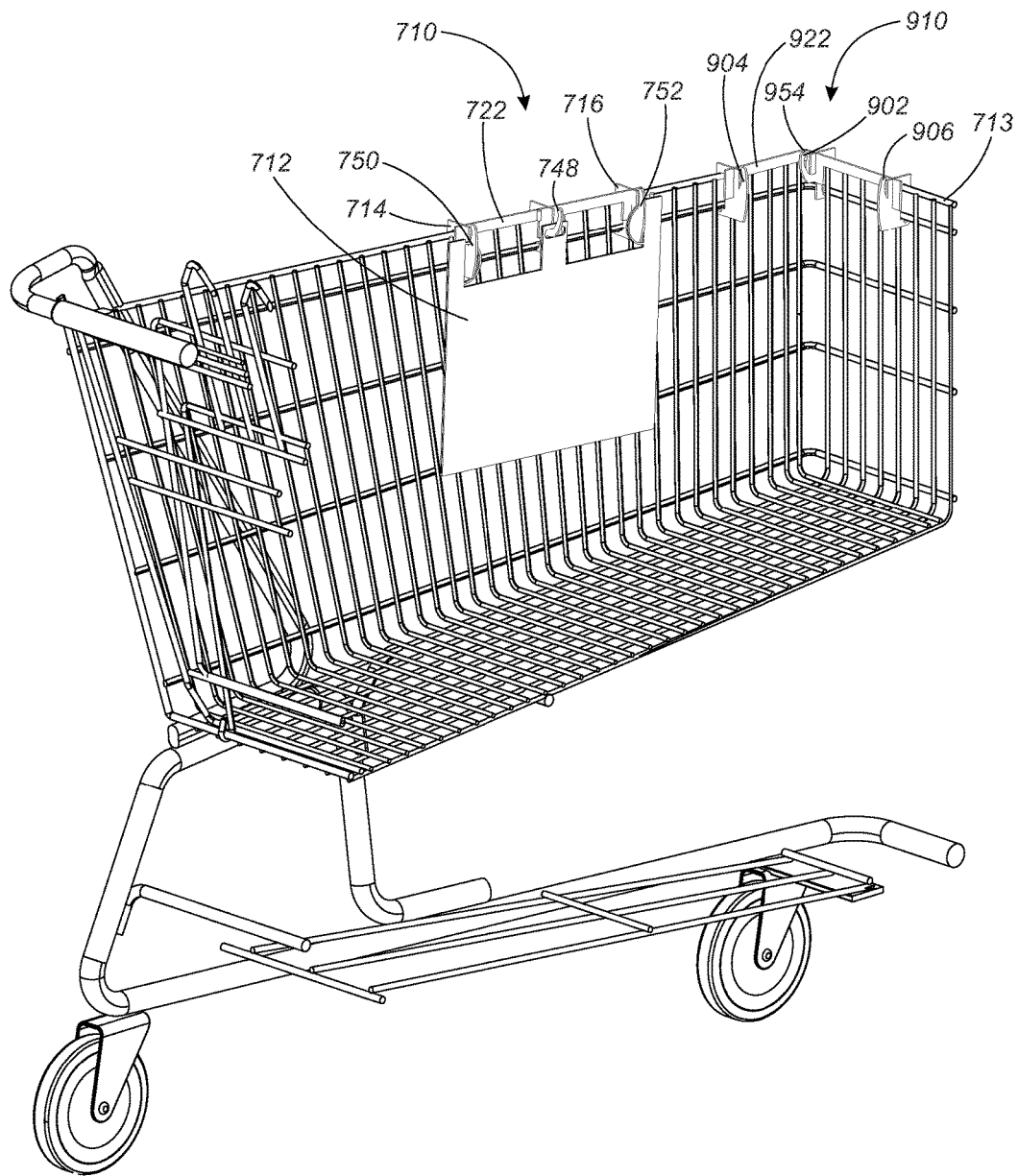
FIG. 1 shows a cutaway view of a shopping cart, with two shopping cart bagging stations mounted to the shopping cart.

Disclosed herein are embodiments of an invention related to retail store fixtures, and, more specifically, to bagging stations that couple to a shopping cart. The disclosed shopping cart bagging stations can be used by customers to bag their purchases as they shop. The shopping cart bagging stations can be made from recyclable materials and can be lightweight and portable. The disclosed shopping cart bagging stations are formed of a plurality of shopping cart bagging station elements that fit together using slot joints. In some embodiments, one or more of the slot joints are rotational slot joints, which allow rotation of one or more of the shopping cart bagging station elements. The rotation of one or more of the shopping cart bagging station elements allow the shopping cart bagging station to be folded up into a compact form when not in use, and quickly and easily opened for use. In some embodiments, a support bar of the shopping cart bagging station has a hinge so that the support bar can be folded to fit in a corner of the shopping cart. The shopping cart bagging station can be kept by a customer and brought into the store for use. The shopping cart bagging stations can be stored in a folded position and unfolded and used when needed. Alternatively, the shopping cart bagging station can be kept at a retail store and loaned to customers to use while they are in the store.

In a specific embodiment, a disclosed shopping cart bagging station includes a plurality of shopping cart bagging station elements, which include a support bar, a first and a second cart coupling hook, a first and a second handle holder arm, and a bag holder hook. The plurality of shopping cart bagging station elements include a plurality of slots, which are used to couple the plurality of shopping cart elements together to form the shopping cart bagging station. The slots are used to couple elements together using slot joints. At least one of the slots includes a rod within the slot. The rod is used to couple elements together to form a rotational slot joint. The rotational slot joint allows rotation of coupled elements so the bagging station elements can be folded into a more compact form when not in use. The shopping cart bagging station holds at least one shopping bag, and dispenses shopping bags one at a time as products are placed in a shopping bag. The first and the second cart coupling hooks are configured to couple the shopping cart bagging station to a shopping cart. The bag holder hook extends from the support bar, and holds the one or more shopping bags. The first and second shopping bag handle holder arms each hold a handle of a shopping bag so the shopping bag is held open and items can be placed in the shopping bag.

Disclosed herein is a shopping cart bagging station that in a particular embodiment includes a means to hold a plurality of shopping bags, and a means to rotatably couple a first and a second handle holder arm to the means to hold the plurality of shopping bags. In some embodiments, the shopping cart bagging station also includes a means to rotatably couple a first and a second cart coupling hook to the means to hold the plurality of shopping bags. The means to hold the plurality of shopping bags, the means to rotatably couple a first and a second handle holder arm to the means to hold the plurality of shopping bags, and the means to rotatably couple a first and a second cart coupling hook to the means to hold the plurality of shopping bags can take many different forms. The examples shown and described in this document are not meant to be limiting, and many other variations are possible in light of the teachings in this document.

In another specific embodiment, the shopping cart bagging station includes a hinged support bar. The hinged support bar allows the shopping cart bagging station to be folded at the hinge. A first and a second shopping cart mounting assembly is coupled to the support bar. The first and the second shopping cart mounting assembly each include a handle holder arm that holds a handle of at least one shopping bag. The first and the second shopping cart mounting assembly each also include a cart coupling hook that couples the shopping cart bagging station to a shopping cart. The shopping cart bagging station can also include a bag holder assembly that holds a stack of shopping bags and can include a third cart coupling hook. The shopping cart bagging station holds at least one shopping bag, and dispenses the shopping bags one at a time as products are placed in a shopping bag. The cart coupling hooks are configured to couple the shopping cart bagging station to a shopping cart. The bag holder hook extends from the support bar, and holds at least one shopping bag. The handle holder arms each hold a handle of a shopping bag so the shopping bag is held open and items can be placed in the shopping bag.

FIG. 1 shows a cutaway perspective view of a shopping cart 713 with two shopping cart bagging stations 710 and 910 mounted to shopping cart 713. Shopping cart bagging stations 710 and 910 can be mounted in various locations on shopping cart 713, making it easy and convenient for a customer to carry and load a plurality of shopping bags 712 as they shop. Shopping cart bagging stations 710 and 910 can be provided by the retail store for customer use, much like the use of shopping cart 713. Or, in some embodiments, shopping cart bagging station 710 or 910 is brought into the store by the customer. The disclosed shopping cart bagging stations 710 and 910 provide a means for a customer to load purchases into bags as they shop, instead of having to bag their purchases at a checkout station. Shopping cart bagging stations 710 and 910 can be made from a lightweight material such as cardboard, plastic, wood, or other lightweight material, and can be made from recyclable material so that shopping cart bagging stations 710 and 910 are lightweight, easily carried, and can be recycled at end of life.

Figure 4:
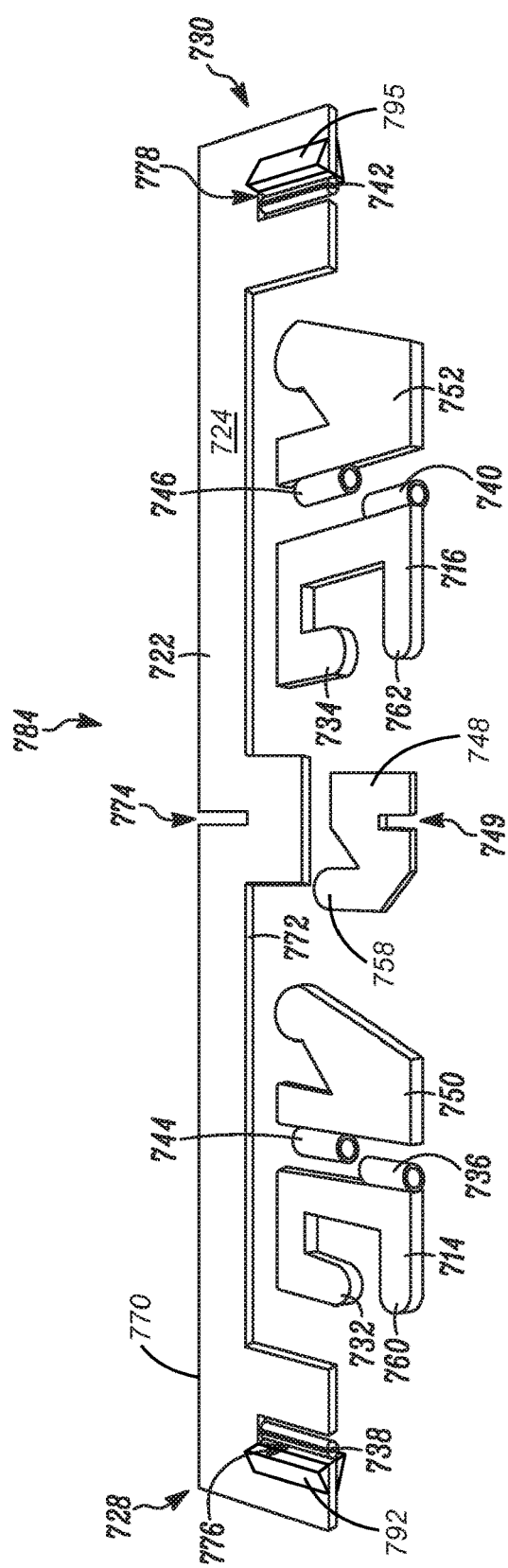
FIG. 4 shows a perspective view of a plurality of bagging station elements that make up the shopping cart bagging station of FIG. 2.
Figure 5:
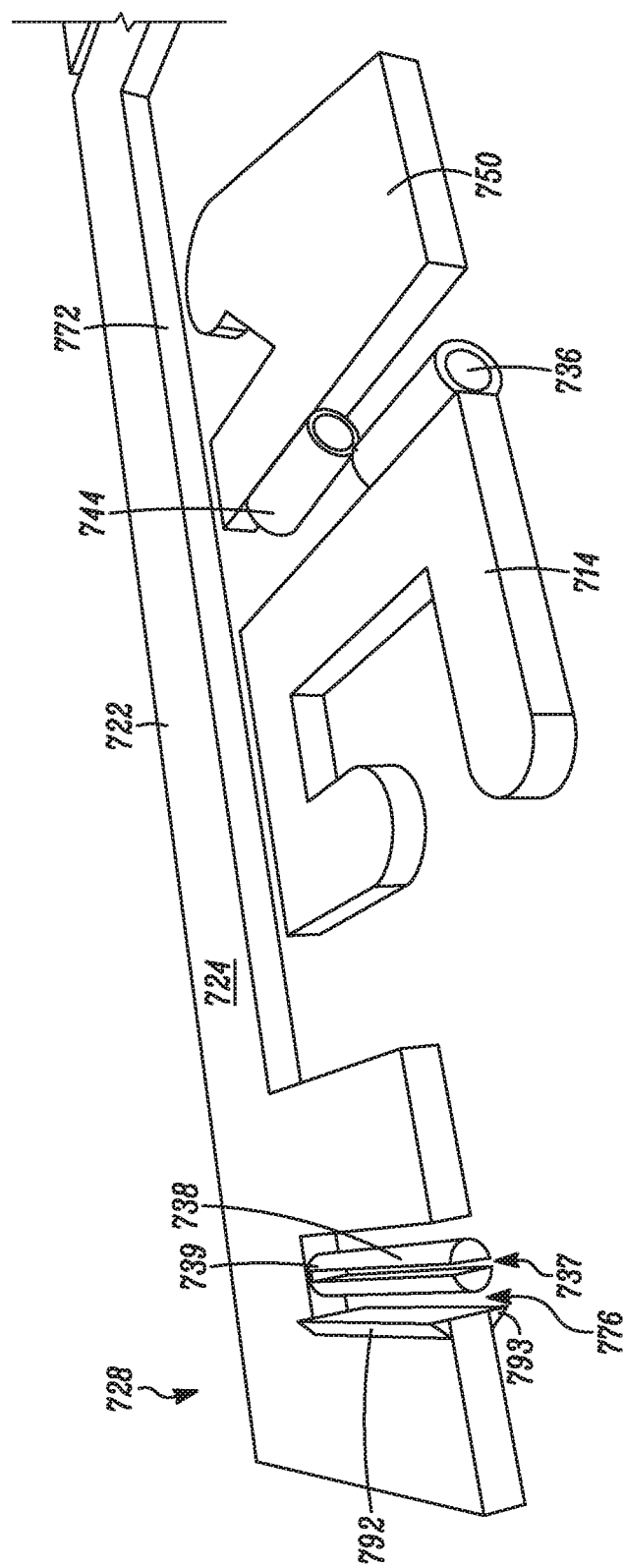
FIG. 5 shows a front perspective view of one end of a support bar of the shopping cart bagging station of FIG. 2, showing a close-up of a rod and rotation stops coupled to the support bar, and a front perspective view of a cart mounting hook and a shopping bag handle holder arm.
Figure 6:
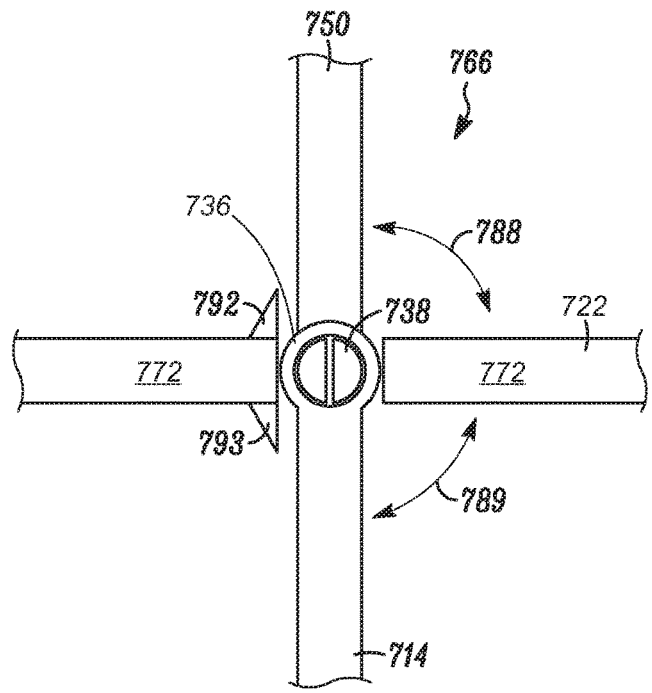
FIG. 6 shows a close-up bottom view of a rotational slot joint of the shopping cart bagging station of FIG. 2, showing the placement of two rotation stops.
Figure 7:
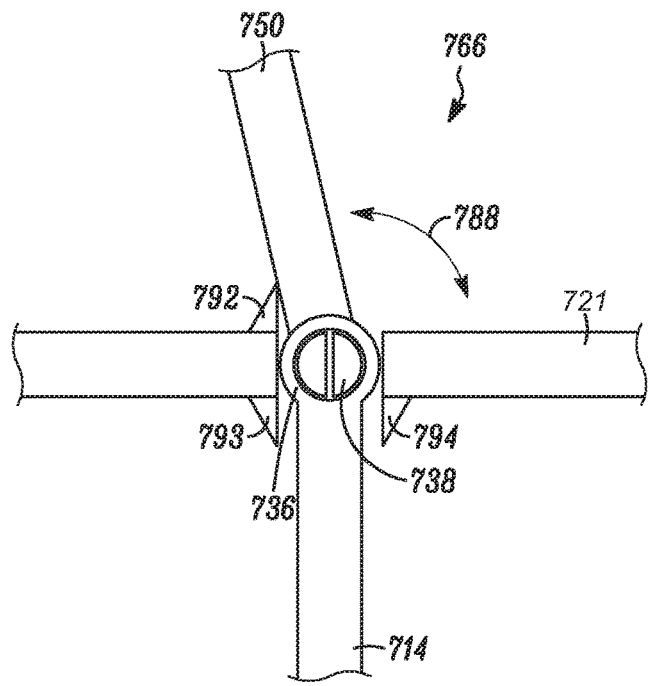
FIG. 7 shows a close-up bottom view of the rotational slot joint of the shopping cart bagging station of FIG. 2, showing an embodiment with three rotation stops.
Figure 8:
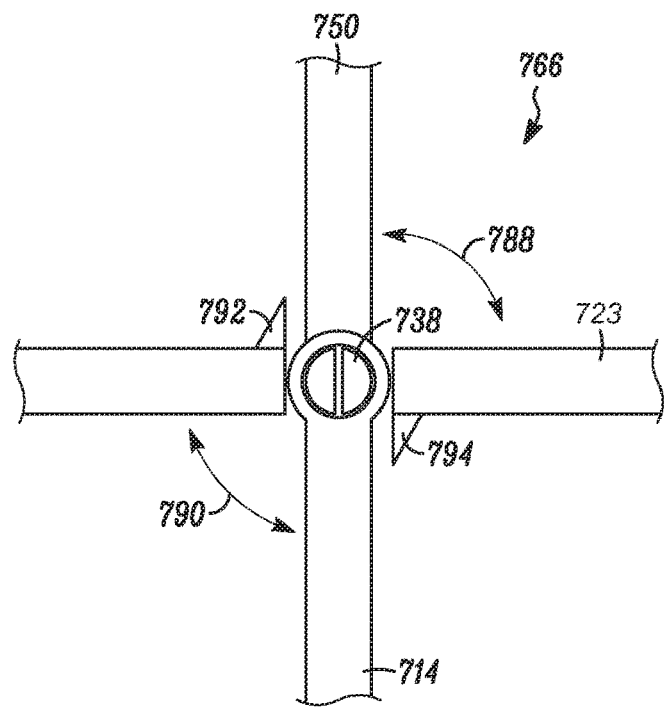
FIG. 8 shows a close-up bottom view of the rotational slot joint of the shopping cart bagging station of FIG. 2, showing an additional embodiment with two rotation stops.
Figure 9:
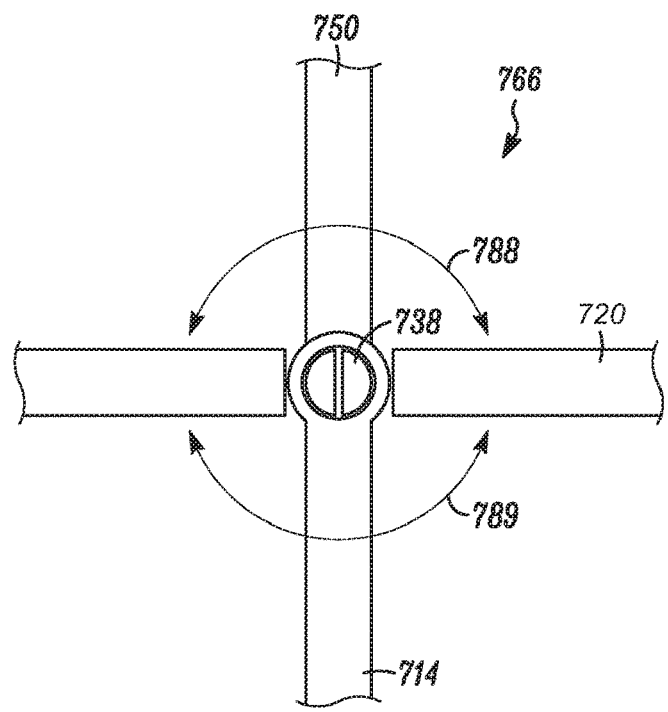
FIG. 9 shows a close-up bottom view of the rotational slot joint of the shopping cart bagging station of FIG. 2, showing an embodiment with no rotation stops.

FIG. 2 through FIG. 9 show details of shopping cart bagging station 710. FIG. 2 shows a front perspective view of shopping cart bagging station 710. FIG. 3 shows an additional perspective view of shopping cart bagging station 710. FIG. 4 shows a plurality of shopping cart bagging station elements 784 which comprise the elements of shopping cart bagging station 710. FIG. 5 shows a close-up view of a first end 728 of a support bar 722 of shopping cart bagging station 710, and a close-up view of a cart coupling hook 714 and a handle holder arm 750. FIG. 6 shows a close-up bottom view of one embodiment of a rotational slot joint 766 of shopping cart bagging station 710, showing one possible placement of rotation stops 792 and 793. FIG. 7 shows a close-up bottom view of an alternate embodiment of rotational slot joint 766 of shopping cart bagging station 710, showing a possible placement of an additional rotation stop 794. FIG. 8 shows a close-up bottom view of a further embodiment of rotational slot joint 766 of shopping cart bagging station 710, showing the use of rotation stops 792 and 794. FIG. 9 shows a close-up bottom view of one more embodiment of rotational slot joint 766 of shopping cart bagging station 710, where rotational slot joint 766 in this embodiment does not use any rotation stops.

Shopping cart bagging station 710 includes plurality of individual shopping cart bagging station elements 784 (see FIG. 4) coupled together using a plurality of slot joints 719, as shown in FIG. 2 and FIG. 3. In this embodiment, plurality of shopping cart bagging station elements 784 includes six elements, which include a support bar 722, a bag holder hook 748, a first and a second shopping cart coupling hook 714 and 716, and a first and a second handle holder arm 750 and 752.

Bag holder hook 748 is coupled to support bar 722 at slot joint 797, as shown in FIG. 2 and FIG. 3. First and second cart coupling hooks 714 and 716 are removeably, and, in some embodiments rotatably, coupled to support bar 722 at rotational slot joints 766 and 768, as shown in FIG. 2 and FIG. 3. First and second handle holder arms 750 and 752 are removeably and, in some embodiments, rotatably coupled to support bar 722 at rotational slot joints 766 and 768, as shown in FIG. 2 and FIG. 3. In some embodiments, shopping cart bagging station 710 includes more or less than six elements.

Plurality of shopping cart bagging station elements 784, when coupled together using plurality of slot joints 719, form shopping cart bagging station 710 (FIG. 1 through FIG. 3). Shopping cart bagging station 710 can be mounted in a shopping cart and used by a customer as they shop to bag their purchases. In the embodiment shown in the figures, bag holder hook 748 coupled to support bar 722 is a means to hold a plurality of shopping bags, but this is not meant to be limiting. First cart coupling hook 714 and second cart coupling hook 716 are means to couple the means to hold the plurality of shopping bags to a shopping cart, but this is not meant to be limiting. First and second handler holder arms 750 and 752 are means to hold one of the plurality of shopping bags open for insertion of items, but this is not meant to be limiting. The means to hold a plurality of shopping bags, the means to couple the means to hold the plurality of shopping bags to a shopping cart, and the means to hold one of the plurality of shopping bags open can take many different forms.

Shopping cart bagging station 710 holds and dispenses a plurality of shopping bags 712, as shown in FIG. 1. In this embodiment, plurality of shopping bags 712 are plastic shopping bags, but this is not meant to be limiting. Bag holder hook 748 holds plurality of shopping bags 712. Often, plurality of plastic shopping bags 712 is hung onto bag holder hook 748 by a hole through the stack of bags. First and second shopping bag handle holder arms 750 and 752 hold the handles of one or more than one of plurality of shopping bags 712 to hold one shopping bag open to be filled with items. When a user wishes to fill a first one of plurality of shopping bags 712, a bag is pulled open from bag holder hook 748 and the handles held by first and second shopping bag handle holder arms 750 and 752. This leaves the shopping bag open and hanging from first and second shopping bag handle holder arms 750 and 752. First and second handle holder arms 750 and 752 support the bag and the items placed in the bag. Once the user is done filling the bag, the bag is removed from shopping cart bagging station 710, and the process is repeated with a next one of plurality of shopping bags 712 until all items are bagged. Once all purchased items are in bags, shopping cart bagging station 710 can be removed from shopping cart 713 and stored or carried. In the embodiment shown in FIG. 2 and FIG. 3, first and second handle holder arms 750 and 752 can be rotated to fold them against support bar 722, in order to keep shopping cart bagging station 710 small in size and configuration, for storage and carrying. First and second cart coupling hooks 714 and 716 also rotate to fold up against support bar 722.

Support bar 722 of shopping cart bagging station 710 includes a front surface 724, a rear surface (not shown), a first end 728 and a second end 730 opposing first end 728, as shown in FIG. 2 through FIG. 4. Support bar 722 also includes a top edge 770 (FIG. 2 and FIG. 4) and a bottom edge 772. Support bar 722 in this embodiment also includes a first support bar slot 776, a second support bar slot 778, and a third support bar slot 774, as shown in FIG. 4. Third support bar slot 774 extends into support bar 722 from top edge 770 (FIG. 4). First and second support bar slots 776 and 778 extend into support bar 722 from bottom edge 772, as shown in FIG. 4.

First support bar slot 776 includes a first rod 738, as shown in FIG. 4 and FIG. 5. Second support bar slot 778 includes a second rod 742, as shown in FIG. 4. First support bar slot 776 with first rod 738, and second support bar slot 778 with second rod 742 are used to rotatably couple first and second cart coupling hooks 714 and 716, and first and second handle holder arms 750 and 752, to support bar 722, as explained herein.

First rod 738 is positioned inside first support bar slot 776 so that first rod 738 and first support bar slot 776 are collinear, with first rod 738 extending along the length of first support bar slot 776, as shown in FIG. 4 and FIG. 5. First rod 738 is coupled to support bar 722 at first rod first end 739 (FIG. 5). First rod 738 is divided by a rod slot 737. Rod slot 737 allows first rod 738 to expand and contract to receive and hold first cart coupling hook 714 and first handle holder arm 750. First rod 738 is used to rotatably couple first cart coupling hook 714 and first handle holder arm 750 to support bar 722. First cart coupling hook 714 includes a hollow sleeve 736, as shown in FIG. 4 and FIG. 5. First handle holder arm 750 includes a hollow sleeve 744, as shown in FIG. 4 and FIG. 5. Hollow sleeves 736 and 744 are slid over first rod 738 to form rotational slot joint 766 (FIG. 2, FIG. 3, and FIG. 6 through FIG. 9). Rod slot 737 allows first rod 739 to flex in diameter, and makes it easier to slide hollow sleeve 736 and hollow sleeve 744 onto first rod 738. First handle holder arm 750 and first cart coupling hook 714 are rotatably coupled to first rod 738 to form first rotational slot joint 766. First handle holder arm 750 is rotatably coupled to first rod 738 by sliding hollow sleeve 744 over first rod 738. First cart coupling hook 714 is rotatably coupled to first rod 738 by sliding hollow sleeve 736 over first rod 738. In this embodiment, rotational slot joint 766 allows first handle holder arm 750 to rotate through angle 788, as shown in FIG. 2 and FIG. 3.

Second rod 742 is positioned inside second support bar slot 778 so that second rod 742 and second support bar slot 778 are collinear, and second rod 742 extends along the length of second support bar slot 778, as shown in FIG. 4. Second rod 742 is coupled to support bar 722 at a second rod first end (similar to first rod first end 739 shown in FIG. 5). Second rod 738 is divided by a rod slot (similar to rod stop 737 of first rod 738 shown in FIG. 5). Second rod 742 is used to rotatably couple second cart coupling hook 716 and second handle holder arm 752 to support bar 722. Second cart coupling hook 716 includes a hollow sleeve 740, as shown in FIG. 4. Second handle holder arm 752 includes a hollow sleeve 746, as shown in FIG. 4. Hollow sleeve 740 and 746 are slid over second rod 742 to form rotational slot joint 768 (FIG. 2 and FIG. 3). Second handle holder arm 752 and second cart coupling hook 716 are rotatably coupled to second rod 742 to form second rotational slot joint 768. Second handle holder arm 752 is rotatably coupled to second rod 742 by sliding hollow sleeve 746 over second rod 742. Second cart coupling hook 716 is rotatably coupled to second rod 742 by sliding hollow sleeve 740 over second rod 742. In this embodiment, rotational slot joint 768 allows second handle holder arm 752 to rotate through an angle 790, as shown in FIG. 2 and FIG. 3.

Support bar 722, in the embodiment shown in FIG. 2 through FIG. 5, also includes rotation stops 792, 793, 795 and 796, as shown in FIG. 2 through FIG. 6. Rotation stops 792, 793, 795 and 796 are coupled to support bar 722 alongside support bar slots 776 and 778 as seen in FIG. 3 and FIG. 4. Rotation stop 792 and 795 are coupled to front surface 724. Rotation stops 793 and 796 are coupled to the back surface of support bar 722. Rotation stops 792, 793, 795 and 796 are used to control the direction and amount of rotation of cart coupling hooks 714 and 716, and handle holder arms 750 and 752. Rotation stops 792, 793, 795, and 796 block rotation of an element when they are present, and allow rotation when they are absent. Rotation stops 792 and 793 are used with first support bar slot 776 to control the rotational amount and direction of first handle holder arm 750 and first cart coupling hook 714, as shown in the figures and described in more detail below in connection with FIG. 6. Rotation stops 795 and 796 are used with second support bar slot 778 to control the rotational amount and direction of second handle holder arm 752 and second cart coupling hook 716.

FIG. 6 shows a bottom close-up view of rotational slot joint 766, including first rod 738 with hollow sleeve 736 of cart coupling hook 714 and hollow sleeve 744 of handle holder arm 750 slid over first rod 738 (hollow sleeve 744 is not visible in FIG. 6). Rotation stops 792 and 793 are used to control the amount and direction of rotation of first cart coupling hook 714 and first handle holder arm 750. First handle holder arm 750 rotates through rotation angle 788, with rotation angle 788 limited in direction and extent by rotation stop 792 and by support bar 722. First handle holder arm 750 in this embodiment can rotate through rotation angle 788 until first handle holder arm 750 is laying against support bar 722 in one direction, but is prevented from a full 180 degree rotation by rotation stop 792. Similarly, first cart coupling hook 714 rotates through rotation angle 789, limited in direction and extent by rotation stop 793 and support bar 722. First cart coupling hook 714 in this embodiment can rotate in angular rotation angle 789 until first cart coupling hook 714 is laying against support bar 722 in one direction, but is prevented from a full 180 degree rotation by rotation stop 793. In the embodiment shown in FIG. 6, both first cart coupling hook 714 and first handle holder arm 750 can rotate such that they are laying against support bar 722 in a folded up position. This allows shopping cart bagging station 710 to be put in a folded position for storage or transport. Rotation angles 788 and 789 are limited in extend to between about 90 and 120 degrees, in this embodiment. Rotation stops 795 and 796 are used to similarly limit the directions and extent of second cart coupling hook 716 and second handle holder arm 752 of rotational slot joint 768.

Rotation stops 792, 793, 795 and 796 can take many different embodiments, or be eliminated. FIG. 7 through FIG. 9 show additional embodiments of the use of rotation stops to control the direction and extend of the rotation of first cart coupling hook 714 and first handler holder arm 750. Additional embodiments of rotational slot joint 768 are similarly envisioned.

FIG. 7 shows a bottom view of an additional embodiment of rotational slot joint 766. In this embodiment, support bar 722 is replaced with a support bar 721. Support bar 721 is the same as support bar 722, except support bar 721 includes a rotation stop 794 in addition to rotation stop 792 and 793. In the embodiment shown in FIG. 7, rotation stop 792 limits the amount and extent of rotation of first handle holder arm 750 through rotation angle 788. First handle holder arm 750 in this embodiment can rotate in angular rotation angle 788 until first handle holder arm 750 is laying against support bar 721 in one direction, but is prevented from a full 180 degree rotation by rotation stop 792. Rotation stops 793 and 794 keep first cart coupling hook 714 from rotating against support bar 721 in this embodiment. Rotation stops 793 and 794 restrict the rotation of first cart coupling hook 714 in both directions. In this embodiment, first cart coupling hook 714 is prevented from rotating to a position where first cart coupling hook 714 is laying against support bar 722. Rotation stops 793 and 794 restrict the extent and direction of rotation of cart coupling hook 714 such that cart coupling hook 714 cannot be made to lay against support bar 721 in either direction.

FIG. 8 shows a third embodiment of rotational slot joint 766. In this embodiment, support bar 721 is replaced with a support bar 723. Support bar 723 is the same as support bar 721, except in this embodiment, rotation stop 793 has been eliminated as compared to the embodiment shown in FIG. 7.

In the embodiment shown in FIG. 8, first handle holder arm 750 rotates through rotation angle 788, with rotation angle 788 limited in direction and extent by rotation stop 792 and by support bar 723, as described above in connection with FIG. 6 and FIG. 7. Similarly, first cart coupling hook 714 rotates through rotation angle 790, limited in extent and direction by rotation stop 794 and support bar 723. In the embodiment shown in FIG. 8, both first cart coupling hook 714 and first handle holder arm 750 can rotate such that they are laying against support bar 722 in a folded up position. Rotation angles 788 and 790 are limited in extent to between about 90 and about 120 degrees in this embodiment.

FIG. 9 shows a fourth embodiment of rotational slot joint 766. In this embodiment, support bar 723 is replaced with a support bar 720. Support bar 720 is the same as support bar 723, except in this embodiment of rotational slot joint 766 shown in FIG. 9, no rotation stops are used, which allows rotation of first handle holder arm 750 in rotation angle 788, and allows rotation of first cart coupling hook 714 in rotation angle 789. Rotation angle 788 and rotation angle 789 are both about 180 degrees in this embodiment. Both first cart coupling hook 714 and first handle holder arm 750 can rotate through approximately 180 degrees. Both first cart coupling hook 714 and first handle holder arm 750 can rotate such that either side is laying against support bar 720.

It is to be understood that the examples shown and described of the use of rotation stops 792, 793, 794, 795 and 796 are examples only. Many other combinations of the use or lack of rotation stops is possible to allow or prevent the direction and extent of rotation of handle holder arms 750 and 752 and/or cart coupling hooks 714 and 716.

Referring back to FIG. 2 through FIG. 4, first cart coupling hook 714 also includes a cart hook 732 and a post 760, as shown in FIG. 3 and FIG. 4. Second cart coupling hook 716 includes a cart hook 734 and a post 762. Cart hooks 732 and 734 hook cart coupling hooks 714 and 716, and shopping cart bagging station 710, to shopping cart 713. Posts 760 and 762 help keep hooks 732 and 734 coupled to shopping cart 713.

Shopping cart bagging station 710 also includes bag holder hook 748. FIG. 2 and FIG. 3 show bag holder hook 748 coupled to support bar 722. FIG. 4 illustrates bag holder hook 748 separated from support bar 722. Bag holder hook 748 includes a bag holder hook slot 749, as shown in FIG. 4. Bag holder hook 748 couples to support bar 722 by sliding bag holder hook slot 749 into third support bar slot 774, forming third slot joint 797, as shown in FIG. 2 and FIG. 3. In this way, bag holder hook 748 is removeably coupled to support bar 722 using third support bar slot 774, and bag holder hook slot 749. Bag holder hook 748, in this embodiment, includes an elongate bag arm 758, which points towards top edge 770 of support bar 722 so that plurality of shopping bags 712 can be hung on bag holder hook 748 (FIG. 1). Bag arm 758, in this embodiment, extends from front surface 724 approximately halfway between first end 728 and second end 730 of support bar 722. Bag holder hook 748 can take many different forms. Any form that allows bag holder hook 748 to hold a plurality of shopping bags can be used. In some embodiments, bag holder hook 748 also includes a means to couple bag holder hook 748 to a shopping cart. When bag holder hook 748 includes a means to couple bag holder hook 748 to a shopping cart, bag holder hook 748 helps couple shopping cart bagging station 710 to the shopping cart. In some embodiments, the means to couple bag holder hook 748 to a shopping cart is a cart coupling hook.

With first and second cart coupling hooks 714 and 716 coupling shopping cart bagging station 710 to shopping cart 713, shopping cart bagging station 710 can be used by a customer to dispense bags as needed while the customer shops. Shopping cart bagging station 710 can be coupled to many different location on shopping cart 713. Shopping cart bagging station 710 can be coupled to the interior or exterior of shopping cart 713. Shopping cart bagging station 710 can be coupled to the front, sides, rear, edges, or bottom of shopping cart 713.

Support bar 722 can take many different forms. In some embodiments, support bar 722 includes a first support bar portion and a second support bar portion, where the first and the second support bar portions are coupled together using a hinge. This allows support bar 722 to fold at the hinge and store in a smaller space. FIG. 10 through FIG. 13 show an example embodiment of a shopping cart bagging station with a support bar that has a hinge.

Figure 10:
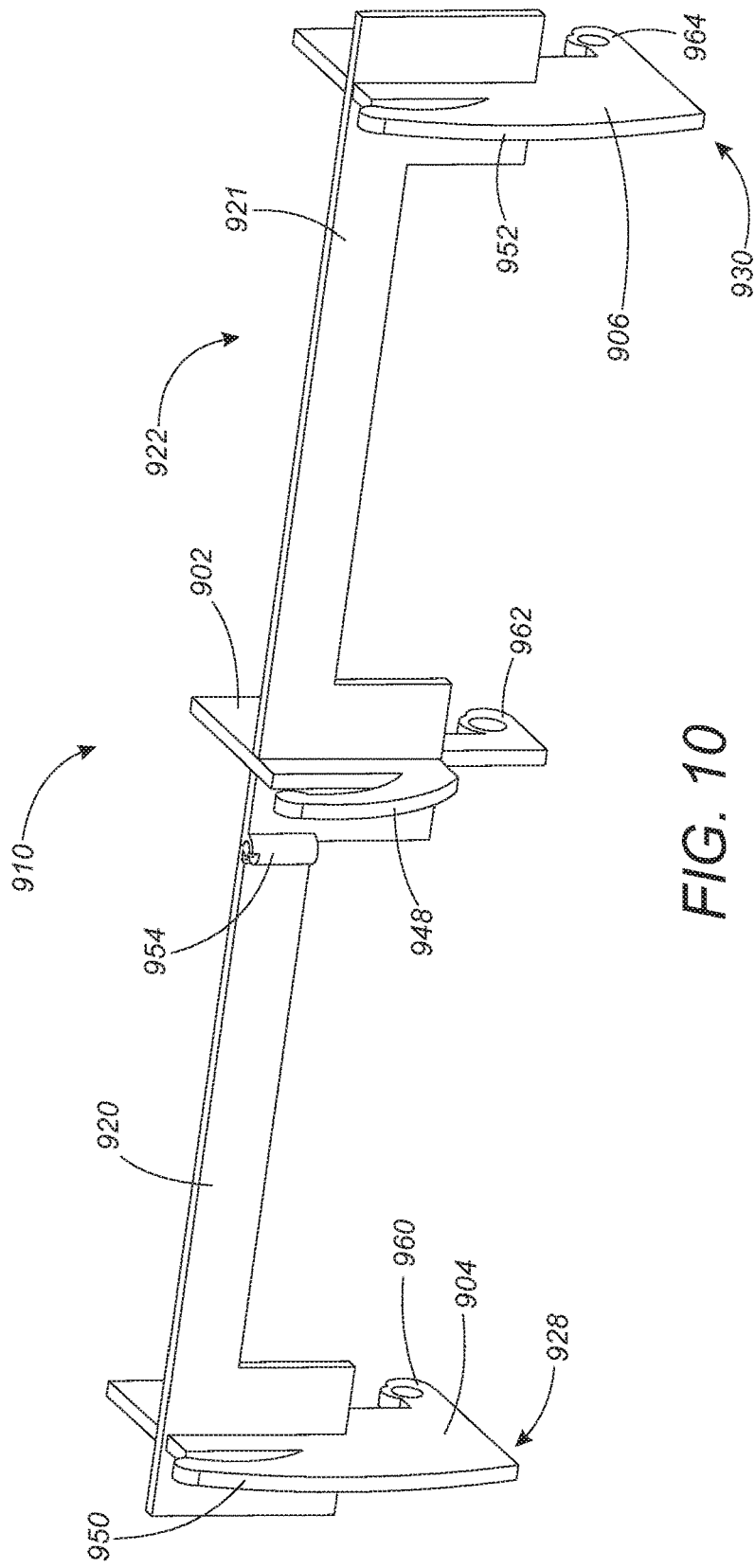
FIG. 10 shows a front perspective view of a further embodiment of a shopping cart bagging station.
Figure 11:
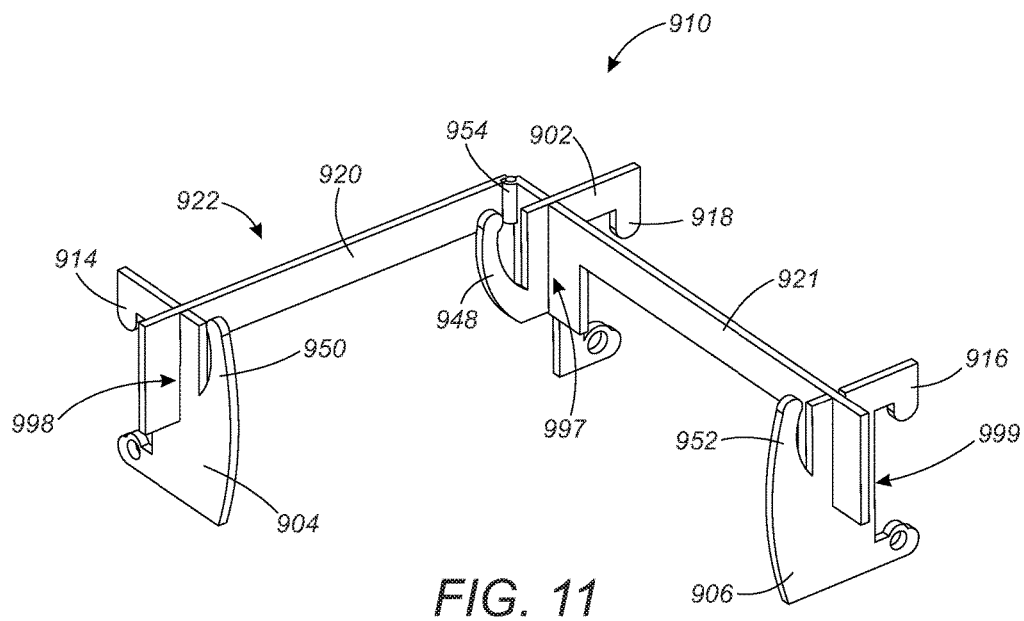
FIG. 11 shows a front perspective view of the shopping cart bagging station of FIG. 10, with the support bar folded at a hinge.
Figure 12:
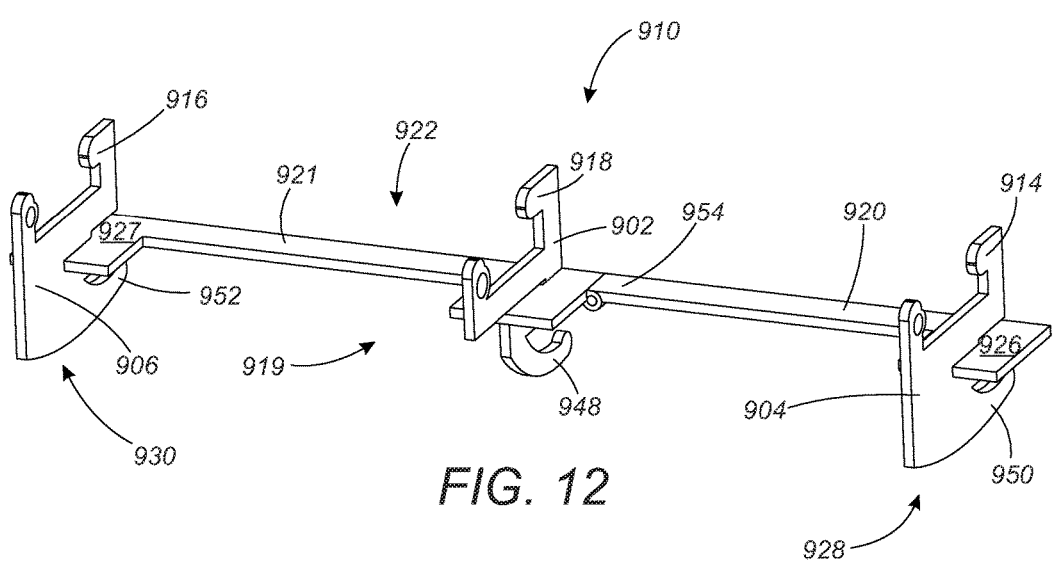
FIG. 12 shows a rear perspective view of the shopping cart bagging station of FIG. 10.
Figure 13:
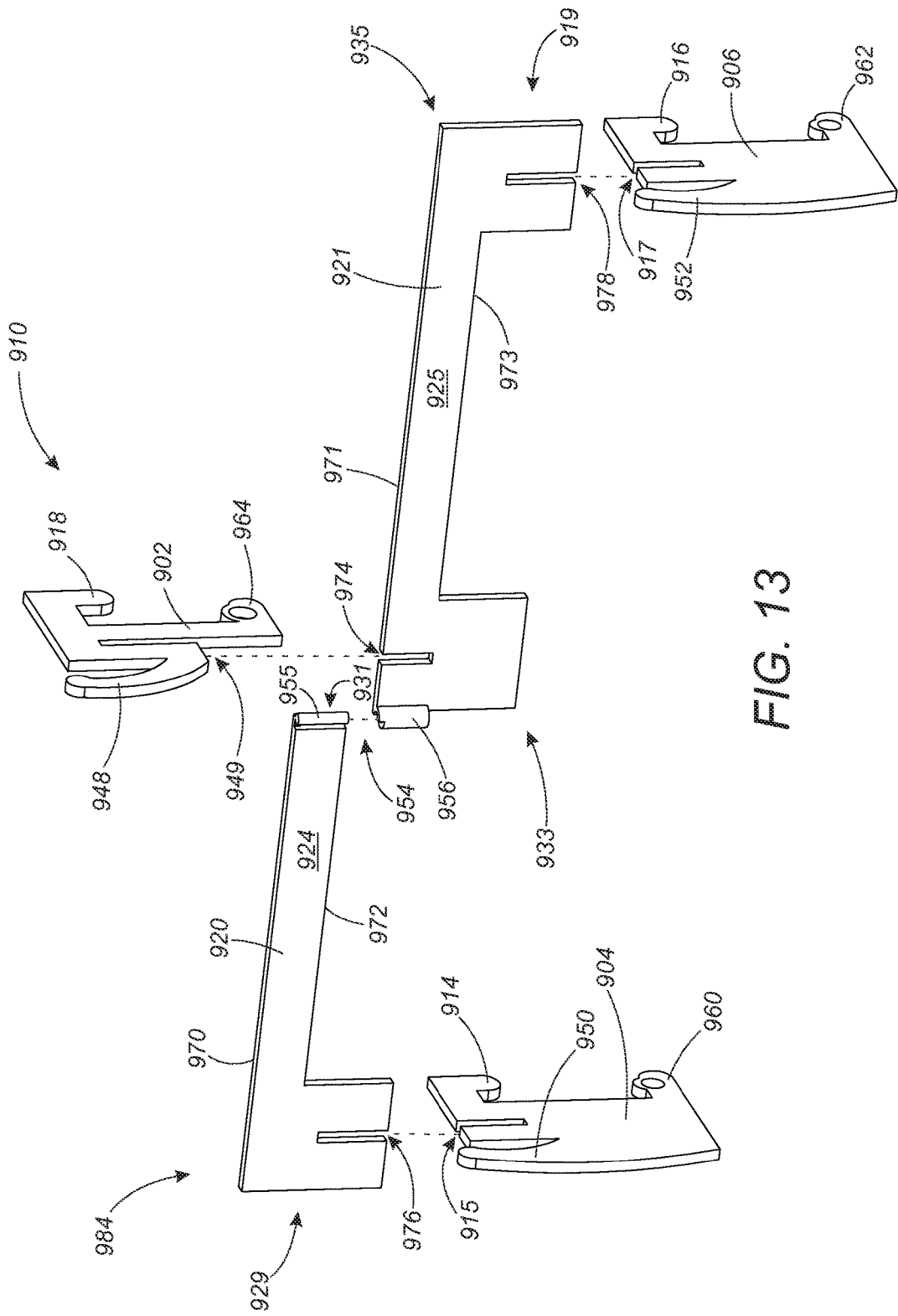
FIG. 13 shows an exploded view of the shopping cart bagging station of FIG. 10.

FIG. 10 through FIG. 13 show details of shopping cart bagging station 910. Shopping cart bagging station 910 has a support bar 922 that is formed of two parts, a first support bar portion 920 and a second support bar portion 921 coupled together with a hinge 954, which allows support bar 922 to fold at hinge 954. FIG. 10 shows a front perspective view of shopping cart bagging station 910. FIG. 11 shows a front perspective view of shopping cart bagging station 910 with support bar 922 folded at hinge 954. FIG. 12 shows a rear perspective view of shopping cart bagging station 910. FIG. 13 shows an exploded view of shopping cart bagging station 910, showing a plurality of shopping cart bagging station elements 984 which comprise the elements of shopping cart bagging station 910.

Shopping cart bagging station 910 includes plurality of individual shopping cart bagging station elements 984 (see FIG. 13) coupled together using a plurality of slot joints 919 (FIG. 12 and FIG. 13). In this embodiment, plurality of shopping cart bagging station elements 984 includes five elements, which includes support bar 922 made up of a first support bar portion 920 and a second support bar portion 921, a bag holder assembly 902, and a first and a second shopping cart mounting assembly 904 and 906.

Support bar 922 includes hinge 954. Support bar 922 folds at hinge 954 as shown in FIG. 11. Support bar 922 folds at hinge 954 so that shopping cart bagging station 910 can fit in a corner of shopping cart 713, as shown in FIG. 1, and so that shopping cart bagging station 910 can fold to be compact for transport and storage. Support bar 922 includes first support bar portion 920 and second support bar portion 921, which are coupled together using hinge 954. Referring to FIG. 13, first support bar portion 920 includes a first support bar portion first end 929, and a first support bar portion second end 931. First support bar portion 920 includes a hinge post 955 coupled to first support bar portion second end 931. Second support bar portion 921 includes a second support bar portion first end 933, and a second support bar portion second end 935. Second support bar portion 921 includes a hinge sleeve 956 coupled to second support bar portion first end 933. Hinge sleeve 956 slides over hinge post 955 to form hinge 954. Hinge sleeve 956 rotates on hinge post 955. Hinge sleeve 956 slides over hinge post 955 to couple first support bar portion 920 to second support bar portion 921 and form support bar 922. Support bar 922 folds at hinge 954.

Support bar first portion 920 of shopping cart bagging station 910 has a support bar first portion front surface 924, a support bar first portion rear surface 926 (FIG. 12), a support bar first portion top edge 970 and a support bar first portion bottom edge 972. Support bar first portion 920 also has a first support bar slot 976 at support bar first portion first end 929. First support bar slot 976 extends into support bar first portion 920 from support bar first portion bottom edge 972. Support bar second portion 921 of shopping cart bagging station 910 has a support bar second portion front surface 925, a support bar second portion rear surface 927 (FIG. 12), a support bar second portion top edge 971 and a support bar second portion bottom edge 973. Support bar second portion 921 also has a second support bar slot 978 and a third support bar slot 974. Second support bar slot 978 is at support bar second portion second end 935. Third support bar slot 974 is at support bar second portion first end 933. Second support bar slot 978 extends into support bar second portion 921 from support bar second portion bottom edge 973. Third support bar slot 974 extends into support bar second portion 921 from support bar second portion top edge 971.

Referring back to FIG. 10 through FIG. 12, bag holder assembly 902 is removeably coupled to support bar 922 at slot joint 997 (FIG. 11). First and second shopping cart mounting structures 904 and 906 are removeably coupled to support bar 922 at slot joints 998 and 999, as shown in FIG. 11. In some embodiments, shopping cart bagging station 910 includes more or less than five elements. Plurality of shopping cart bagging station elements 984, when coupled together using plurality of slot joints 919, form shopping cart bagging station 910 (FIG. 10 through FIG. 13). Plurality of slot joints 919 includes slot joints 997, 998, and 999. Shopping cart bagging station 910 can be mounted in shopping cart 713 as shown in FIG. 1, and used by a customer as they shop to bag their purchases. FIG. 1 shows shopping cart bagging station 910 mounted to shopping cart 713 in a folded configuration, showing how hinge 954 allows shopping cart bagging station 910 to fit on the corner of shopping cart 713. Shopping cart bagging station 910 can be mounted to shopping cart 713 in a folded or an unfolded configuration. FIG. 1 and FIG. 11 show shopping cart bagging station 910 in a folded configuration. FIG. 10 and FIG. 12 show shopping cart bagging station 910 in an unfolded configuration.

Bag holder assembly 902 is removeably coupled to support bar 922 as shown in the figures. Bag holder assembly 902 is a means to hold a plurality of shopping bags, but this is not meant to be limiting. In some embodiments, shopping cart bagging station 910 does not include bag holder assembly 902. First shopping cart mounting assembly 904 and second shopping cart mounting assembly 906 are means to couple the means to hold the plurality of shopping bags to a shopping cart, but this is not meant to be limiting. The means to hold a plurality of shopping bags and the means to couple the means to hold the plurality of shopping bags to a shopping cart can take many different forms.

Shopping cart bagging station 910 holds and dispenses a plurality of shopping bags, similar to shopping cart bagging station 710 as shown in FIG. 1. Shopping cart bagging station 910 can hold plurality of shopping bags 712 similar to what is shown for shopping cart bagging station 710. Shopping cart bagging station 910 is shown in FIG. 1 in a folded position. Shopping cart bagging station 910 can be used folded or unfolded, as shown and described herein.

Bag holder assembly 902 holds a plurality of shopping bags. Often, the plurality of plastic shopping bags is hung onto bag holder assembly 902 by a hole through the stack of bags. First and second shopping cart mounting assemblies 904 and 906 hold the handles of one or more than one of the plurality of shopping bags to hold one shopping bag open to be filled with items. When a user wishes to fill a first one of the plurality of shopping bags, a bag is pulled open from bag holder assembly 902 and the handles held by first and second shopping cart mounting assemblies 904 and 906. This leaves the shopping bag open and hanging from first and second shopping cart mounting assemblies 904 and 906. First and second shopping cart mounting assemblies 904 and 906 support the bag and the items placed in the bag. Once the user is done filling the bag, the bag is removed from shopping cart bagging station 910, and the process is repeated with a next one of the plurality of shopping bags until all items are bagged. Once all purchased items are in bags, shopping cart bagging station 910 can be removed from shopping cart 713 and stored or carried. In the embodiment shown in FIG. 10 through FIG. 13, shopping cart bagging station 910 can be folded at hinge 954 in order to keep shopping cart bagging station 910 small in size and configuration for storage and carrying. In some embodiments, both first and second shopping cart mounting assemblies can rotate to fold up against support bar 922 as explained above for shopping cart bagging station 710.

First and second shopping cart mounting assemblies 904 and 906 are removeably coupled to support bar 922. First shopping cart mounting assembly 904 has a first mounting assembly slot 915, as shown in FIG. 13. First mounting assembly slot 915 couples to first support bar slot 976 to form first slot joint 998, and to removeably couple first shopping cart mounting assembly 902 to first support bar portion 920 of support bar 922. Second shopping cart mounting assembly 906 has a second mounting assembly slot 917, as shown in FIG. 13. Second mounting assembly slot 917 couples to second support bar slot 978 to form second slot joint 999, and to removeably couple second shopping cart mounting assembly 906 to second support bar portion 921 of support bar 922.

Bag holder assembly 902 is removeably coupled to support bar 922. In this embodiment, bag holder assembly 902 is removeably coupled to first end 933 of second support bar portion 921, but this is not meant to be limiting. In some embodiments, bag holder assembly 902 is removeably coupled to second end 931 of first support bar portion 920. Bag holder assembly 902 has a bag holder hook 948, a bag holder assembly slot 949, a cart coupling hook 918 and a post 964, as shown in FIG. 13. Bag holder assembly slot 949 couples to third support bar slot 974 to form third slot joint 997, and to removeably couple bag holder assembly 902 to second support bar portion 921 of support bar 922. Bag holder assembly 902, in this embodiment, couples to support bar 922 approximately halfway between a first end 928 and a second end 930 of support bar 922. Bag holder hook 948 holds one or more shopping bags. Bag holder hook 948 extends in a direction towards top edge 971 of second support bar portion 921 so that one or more shopping bags hung on bag holder hook 948 stay on bag holder hook 948. Bag holder assembly 902 can take many different forms. Any form that allows bag holder assembly 902 to hold a plurality of shopping bags can be used.

Bag holder assembly 902 also includes cart coupling clip 918, which is a means to couple bag holder assembly 902 and shopping cart bagging station 910 to a shopping cart. Cart coupling clip 918 couples shopping cart bagging station 910 to the shopping cart. Bag holder assembly 902 also includes a post 964 that helps keep cart coupling clip 918 coupled to the shopping cart.

First shopping cart mounting structure 904 is removeably coupled to support bar 922. In this embodiment, first shopping cart mounting structure 904 is removeably coupled to first end 929 of first support bar portion 920. First shopping cart mounting structure 904 has a handle holder arm 950, a mounting assembly slot 915, a cart coupling hook 914, and a post 960, as shown in FIG. 13. Mounting assembly slot 915 couples to first support bar slot 976 to form slot joint 997, and to removeably couple first shopping cart mounting structure 904 to first support bar portion 920 of support bar 922. First shopping cart mounting structure 904, in this embodiment, couples to support bar 922 at first end 928 of support bar 922. First shopping cart mounting structure 904 includes handle holder arm 950, which extends in a direction towards top edge 970 of first support bar portion 920 so that one or more shopping bag handles hung on handle holder arm 950 stay on handle holder arm 950. First shopping cart mounting structure 904 can take many different forms. Any form that allows first shopping cart mounting structure 904 to hold one or more shopping bag handles can be used.

First shopping cart mounting structure 904 also includes a cart coupling clip 914, which is a means to couple first shopping cart mounting structure 904 and shopping cart bagging station 910 to a shopping cart. Cart coupling clip 914 couples shopping cart bagging station 910 to the shopping cart. First shopping cart mounting structure 904 includes post 960 that helps keep cart coupling clip 914 coupled to the shopping cart.

Second shopping cart mounting structure 906 is removeably coupled to support bar 922. In this embodiment, second shopping cart mounting structure 906 is removeably coupled to second end 930 of support bar 922. Second shopping cart mounting structure 906 has a handle holder arm 952, a mounting assembly slot 917, a cart coupling hook 916, and a post 962, as shown in FIG. 13. Mounting assembly slot 917 couples to second support bar slot 978 to form slot joint 999, and to removeably couple second shopping cart mounting structure 906 to second support bar portion 921 of support bar 922. Second shopping cart mounting structure 906 includes handle holder arm 952, which extends in a direction towards top edge 971 of second support bar portion 921 so that one or more shopping bag handles hung on handle holder arm 952 stay on handle holder arm 952. Second shopping cart mounting structure 906 can take many different forms. Any form that allows second shopping cart mounting structure 906 to hold one or more shopping bag handles can be used.

Second shopping cart mounting structure 906 also includes a cart coupling clip 916, which is a means to couple second shopping cart mounting structure 906 and shopping cart bagging station 910 to a shopping cart. Cart coupling clip 916 couples shopping cart bagging station 910 to the shopping cart. Second shopping cart mounting structure 906 includes post 962 that helps keep cart coupling clip 916 coupled to the shopping cart.

With one or more of cart coupling hooks 914, 916, and 918 coupling shopping cart bagging station 910 to a shopping cart, shopping cart bagging station 910 can be used by a customer to dispense bags as needed while the customer shops. Shopping cart bagging station 910 can be coupled to any location of the shopping cart. Shopping cart bagging station 910 can be folded at hinge 954 to allow shopping cart bagging station 910 to be mounted to a corner of a shopping cart, as shown in FIG. 1 with shopping cart bagging station 910 coupled to a corner of shopping cart 713. Shopping cart bagging station 910 can be coupled to the interior or exterior of shopping cart 713, including an exterior corner using hinge 954. Shopping cart bagging station 910 can be coupled to the front, sides, rear, edges, or bottom of shopping cart 713.

Figure 14:
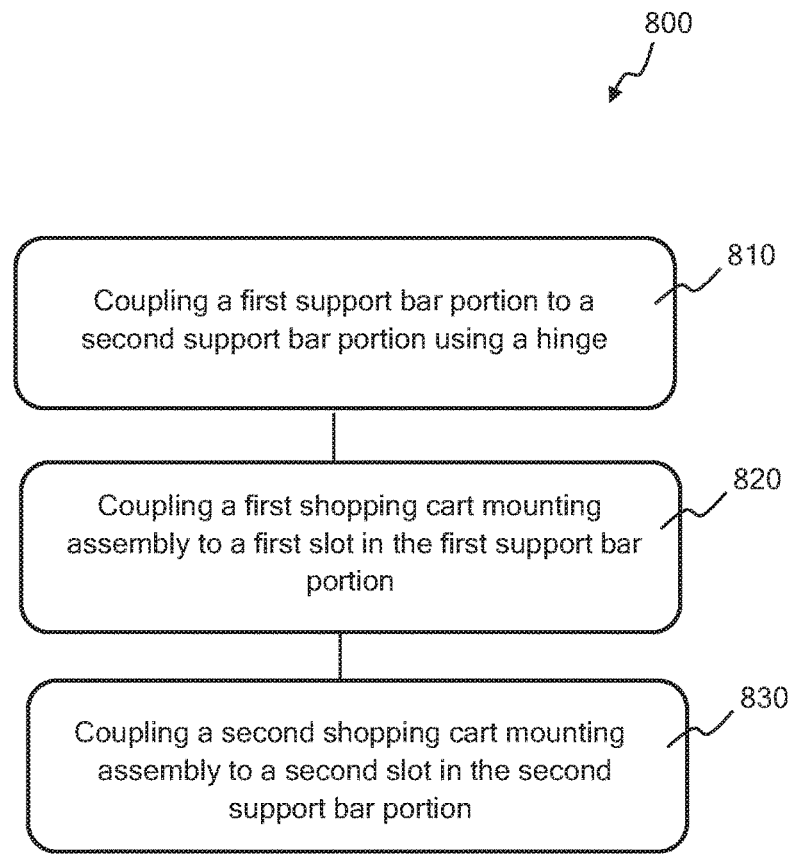
FIG. 14 illustrates a method of forming a bagging station.

FIG. 14 illustrates a method 800 of forming a bagging station. Method 800 includes an act 810 of coupling a first support bar portion to a second support bar portion using a hinge. Coupling the first support bar portion to the second support bar portion with a hinge forms a support bar that folds at the hinge. The hinge can include a hinge post and a hinge sleeve.

Method 800 also includes an act 820 of coupling a first shopping cart mounting assembly to a first support bar slot in the first support bar portion. In some embodiments, the first support bar slot extends into the first support bar portion from a bottom edge of the first support bar portion. In some embodiments, the first shopping cart mounting assembly includes a first mounting assembly slot. The first mounting assembly slot couples to the first support bar slot to couple the first shopping cart mounting assembly to the first support bar portion of the support bar.

Method 800 also includes an act 830 of coupling a second shopping cart mounting assembly to a second support bar slot in the second support bar portion. In some embodiments, the second support bar slot extends into the second support bar portion from a bottom edge of the second support bar portion. In some embodiments, the second shopping cart mounting assembly includes a second mounting assembly slot. The second mounting assembly slot couples to the second support bar slot to couple the second shopping cart mounting assembly to the second support bar portion of the support bar.

Method 800 can includes many other acts. In some embodiments, method 800 includes coupling a bag holder assembly to a third support bar slot in the second support bar portion. In some embodiments, the bag holder assembly includes a bag holder assembly slot, which couples to the third support bar slot to form a slot joint. In some embodiments, the third support bar slot is in the first support bar portion and the bag holder assembly couples to the first support bar portion instead of the second support bar portion.

In some embodiments, method 800 includes using a plurality of slot joints to form the shopping cart bagging station.

Figure 15:
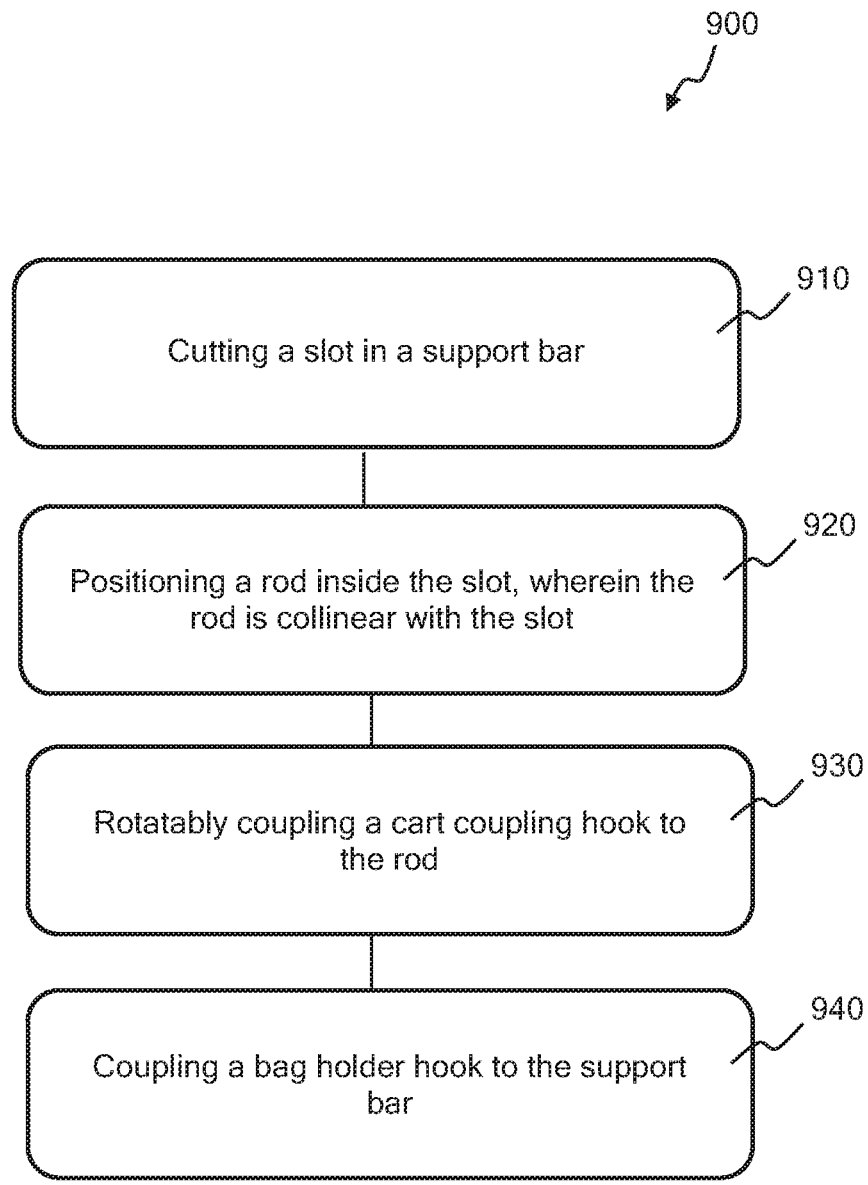
FIG. 15 illustrates a method of forming a bagging station.

FIG. 15 illustrates a method 900 of forming a bagging station. Method 900 includes an act 910 of cutting a support bar slot in a support bar. In some embodiments, method 900 includes coupling a first support bar portion to a second support bar portion to form the support bar. Method 900 also includes an act 920 of positioning a rod inside the support bar slot, where the rod is collinear with the support bar slot. The rod is used to rotatably couple elements to the support bar. Method 900 also includes an act 930 of rotatably coupling a cart coupling hook to the rod. The cart coupling hook is used to couple the shopping cart bagging station to a shopping cart. Method 940 also includes an act 940 of coupling a bag holder hook to the support bar.

Method 900 can include many other acts. In some embodiments, method 900 includes rotatably coupling a handle holder arm to the support bar. In some embodiments, method 900 includes rotatably coupling a handle holder arm to the rod.

In some embodiments, method 900 includes coupling a first hollow sleeve to a cart hook to form the cart coupling hook. In some embodiments, method 900 includes sliding the rod through the first hollow sleeve to couple the cart coupling hook to the rod. In some embodiments, method 900 includes coupling a second hollow sleeve to a handle holder arm. In some embodiments, method 900 includes sliding the rod through the second hollow sleeve to couple the handle holder arm to the support bar.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A shopping cart bagging station comprising:
a support bar comprising:
  a first support bar slot extending into the support bar from a support bar bottom edge;
  a first rod positioned inside the first support bar slot and coupled to the support bar at a first rod first end;
  a second support bar slot extending into the support bar from the support bar bottom edge;
  a second rod positioned inside the second support bar slot and coupled to the support bar at a second rod first end; and
  a third support bar slot extending into the support bar from a support bar top edge;
a bag holder hook removeably coupled to the support bar;
a first and a second cart coupling hook removeably and rotatably coupled to the support bar; and
a first and a second handle holder arm removeably and rotatably coupled to the support bar.

2. The shopping cart bagging station of claim 1, wherein:
the bag holder hook comprises a bag holder hook slot;
the bag holder hook slot couples to the third support bar slot to form a slot joint;
the first cart coupling hook is rotatably coupled to the first rod; and
the second cart coupling hook is rotatably coupled to the second rod.

3. The shopping cart bagging station of claim 2, wherein:
the first handle holder arm is rotatably coupled to the first rod; and
the second handle holder arm is rotatably coupled to the second rod.

4. The shopping cart bagging station of claim 1, wherein:
the first cart coupling hook comprises a first hollow sleeve;
the first cart coupling hook is rotatably coupled to the support bar by sliding the first rod through the first hollow sleeve;
the second cart coupling hook comprises a second hollow sleeve;
the second cart coupling hook is rotatably coupled to the support bar by sliding the second rod through the second hollow sleeve;
the first handle holder arm comprises a third hollow sleeve;
the first handle holder arm is rotatably coupled to the support bar by sliding the first rod through the third hollow sleeve;
the second handle holder arm comprises a fourth hollow sleeve; and
the second handle holder arm is rotatably coupled to the support bar by sliding the second rod through the fourth hollow sleeve.

5. The shopping cart bagging station of claim 1, wherein the support bar comprises a hinge, and wherein the support bar folds at the hinge.

6. A shopping cart bagging station comprising:
a support bar comprising a hinge;
a bag holder assembly removeably coupled to the support bar;
a first shopping cart mounting assembly removeably coupled to the support bar, wherein the first shopping cart mounting assembly comprises a first handle holder arm; and
a second shopping cart mounting assembly removeably coupled to the support bar, wherein the second shopping cart mounting assembly comprises a second handle holder arm.

7. The shopping cart bagging station of claim 6, wherein the support bar further comprises:
a first support bar portion; and
a second support bar portion, wherein the hinge couples the first support bar portion to the second support bar portion.

8. The shopping cart bagging station of claim 7, wherein:
the first shopping cart mounting assembly is removeably coupled to a first support bar slot in the first support bar portion;
the second shopping cart mounting assembly is removeably coupled to a second support bar slot in the second support bar portion; and
the bag holder assembly is removeably coupled to a third support bar slot in the second support bar portion.

9. The shopping cart bagging station of claim 8, wherein
the first support bar slot extends into the first support bar portion from a first support bar portion bottom edge;
the second support bar slot extends into the second support bar portion from a second support bar bottom edge; and
the third support bar slot extends into the second support bar portion from a second support bar portion top edge.

10. The shopping cart bagging station of claim 9, wherein the first shopping cart mounting assembly comprises a first mounting assembly slot, and wherein the first mounting assembly slot couples to the first support bar slot to form a first slot joint.

11. The shopping cart bagging station of claim 10, wherein the second shopping cart mounting assembly comprises a second mounting assembly slot, wherein the second mounting assembly slot couples to the second support bar slot to form a second slot joint.

12. The shopping cart bagging station of claim 11, wherein the bag holder assembly comprises a bag holder assembly slot, and wherein the bag holder assembly slot couples to the third support bar slot to form a third slot joint.

13. The shopping cart bagging station of claim 6, wherein the first shopping cart mounting assembly comprises a first cart coupling hook, and wherein the second shopping cart mounting assembly comprises a second cart coupling hook.

14. The shopping cart bagging station of claim 13, wherein the bag holder assembly comprises a bag holder hook and a third cart coupling hook.

* * * * *